(12) United States Patent
Kano

(10) Patent No.: US 9,019,816 B2
(45) Date of Patent: Apr. 28, 2015

(54) COMMUNICATION SYSTEM, COMMUNICATION METHOD, AND COMMUNICATION APPARATUS

(71) Applicant: Fujitsu Limited, Kawasaki-shi, Kanagawa (JP)

(72) Inventor: Shinya Kano, Inagi (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 13/948,265

(22) Filed: Jul. 23, 2013

(65) Prior Publication Data

US 2013/0301404 A1 Nov. 14, 2013

Related U.S. Application Data

(63) Continuation of application No. PCT/JP2011/052417, filed on Feb. 4, 2011.

(51) Int. Cl.
*H04L 12/26* (2006.01)
*H04L 12/703* (2013.01)
*H04L 12/46* (2006.01)
*H04L 12/709* (2013.01)

(52) U.S. Cl.
CPC .......... *H04L 45/28* (2013.01); *H04L 12/4641* (2013.01); *H04L 45/245* (2013.01)

(58) Field of Classification Search
None
See application file for complete search history.

(56) References Cited

U.S. PATENT DOCUMENTS

| 7,706,259 B2 * | 4/2010 | Kim et al. ............... 370/228 |
| 2002/0105949 A1 | 8/2002 | Shinomiya |
| 2003/0043736 A1 | 3/2003 | Gonda |
| 2007/0253326 A1 * | 11/2007 | Saha et al. ............... 370/217 |
| 2008/0002570 A1 | 1/2008 | Kurokawa et al. |
| 2008/0068985 A1 | 3/2008 | Mieno |
| 2009/0252030 A1 * | 10/2009 | Kashyap et al. .......... 370/216 |
| 2011/0116365 A1 * | 5/2011 | Wu et al. .................. 370/223 |
| 2012/0106360 A1 * | 5/2012 | Sajassi et al. ............ 370/245 |
| 2012/0236730 A1 | 9/2012 | Zhou et al. |

FOREIGN PATENT DOCUMENTS

| CN | 101710877 A | 5/2010 |
| JP | 2002-232427 | 8/2002 |
| JP | 2008-011082 | 1/2008 |

(Continued)

OTHER PUBLICATIONS

Extended European Search Report dated Feb. 17, 2014 for corresponding European Application No. 11857943.2.

(Continued)

*Primary Examiner* — Otis L Thompson, Jr.
(74) *Attorney, Agent, or Firm* — Fujitsu Patent Center

(57) ABSTRACT

Provided is a relay system having a first node and a second node, and a third node and a fourth node provided opposing thereto with connected by VLAN paths, in which the first node notifies, via a second VLAN path, the fourth node of the APS packet in which a state of a first group is stored. The third node notifies, via a third VLAN path, the second node of the APS packet in which a state of a second group is stored. The second node and the fourth node use a fourth VLAN path and exchange the state of the first group and the state of the second group, and, when the states of the first group and the second group are SF-W of a first VLAN path and the self apparatus is master, switch the first VLAN path to the second VLAN path or the third VLAN path.

13 Claims, 20 Drawing Sheets

(56) References Cited

FOREIGN PATENT DOCUMENTS

| | | |
|---|---|---|
| JP | 2008-078893 | 4/2008 |
| WO | WO-2009/035808 A1 | 3/2009 |

OTHER PUBLICATIONS

International Search Report, mailed in connection with PCT/JP2011/052417 and mailed Mar. 8, 2011.

Muley, Praveen et al., wdiff draft-ietf-pwe3-redundancy-03.txt [Online] May 14, 2010, "http://tools.ietf.org/wg/pwe3/draft-ietf-pwe3-redundancy/draft-ietf-pwe3-redundancy-03-from-02.wdiff.html," Retrieved Jun. 4, 2013.

Muley, Praveen et al., wdiff draft-ietf-pwe3-redundancy-bit-02.txt [Online] Oct. 24, 2009, "http://tools.ietf.org/wg/pwe3/draft-ietf-pwe3-redundancy-bit/draft-ietf-pwe3-redundancy-bit-02-from-01.wdiff.html," Retrieved Jun. 4, 2013.

Martini, Luca et al., Diff: draft-ietf-pwe3-iccp-01.txt-draft-ietf-pwe3-iccp-02.txt [Online] Oct. 24, 2009, "http://tools.ietf.org/wg/pwe3/draft-ietf-pwe3-iccp/draft-ietf-pwe3-iccp-02-from-01.diff.html." Retrieved Jun. 4, 2013.

Split Multi-Link Trunking, from Wikipedia, the free encyclopedia, "http://en.wikipedia.org/wiki/Split_multi-link_trunking," [Online] Oct. 25, 2010. Retrieved Jun. 4, 2013.

Sato, Kouji et al., "Technical issues for implementing End-to-End Ethernet Protection Switching", IEICE Technical Report, CS2004-36, Jul. 2, 2004, pp. 45-48. English Abstract.

* cited by examiner

FIG.1
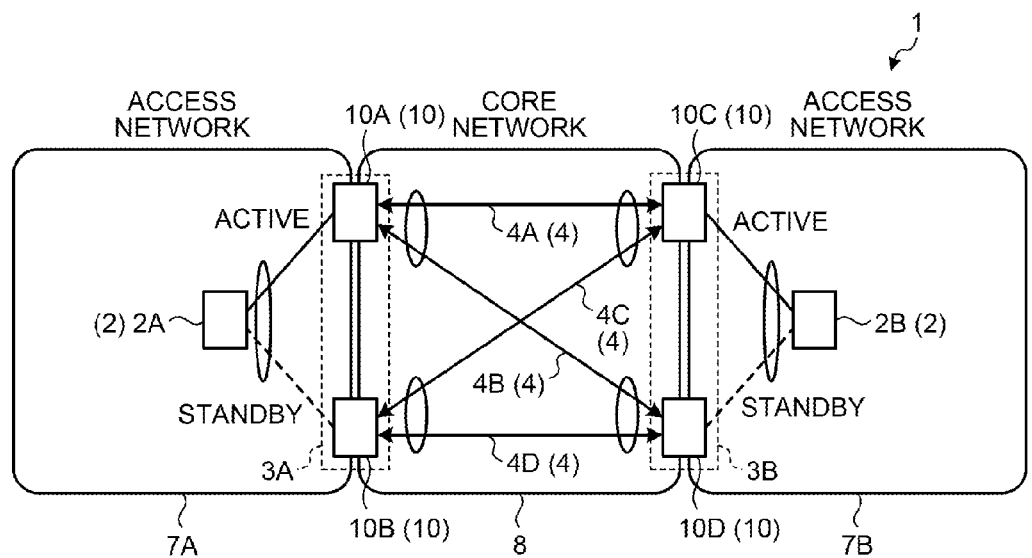
FIG.2
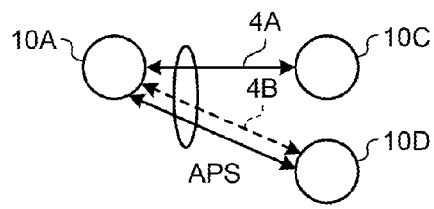
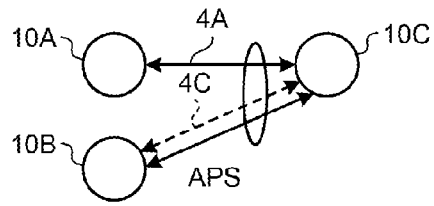

FIG.6

| RECEPTION PORT NUMBER ⌐47A | RECEPTION VLAN ID ⌐47B | TRANSMISSION PORT NUMBER ⌐47C | TRANSMISSION VLAN ID ⌐47D |
|---|---|---|---|
| PORT a | VLAN A | PORT d | VLAN A |
| PORT b | VLAN B | PORT e | VLAN X |
| PORT c | VLAN C | PORT f | VLAN Z |

FIG.7

| LAG NUMBER ⌐48A | PORT NUMBER ⌐48B | LINK STATE ⌐48C |
|---|---|---|
| LAG 1 | PORT w | ACT |
| LAG 1 | PORT x | STANDBY |
| LAG 2 | PORT y | ACT |
| LAG 2 | PORT z | STANDBY |

FIG.9

| ACCESS NETWORK SIDE VLAN INFORMATION | CORE NETWORK SIDE VLAN INFORMATION | | | | PROTECTION STATE |
|---|---|---|---|---|---|
| | ACTIVE VLAN INFORMATION | | BACKUP VLAN INFORMATION | | |
| | VLAN ID | TRANSMISSION PORT NUMBER | VLAN ID | TRANSMISSION PORT NUMBER | |
| VLAN X | VLAN 1 | PORT a | VLAN 2 | PORT i | NR |

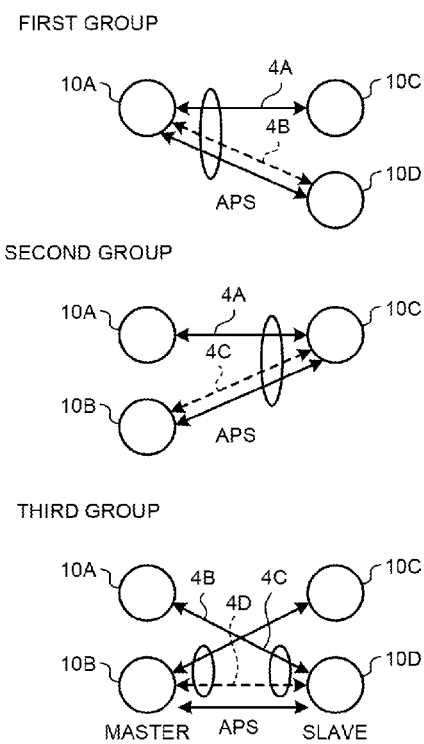

COMMUNICATION SYSTEM, COMMUNICATION METHOD, AND COMMUNICATION APPARATUS

CROSS-REFERENCE TO RELATED APPLICATION

This application is a continuation application of International Application PCT/JP2011/052417, filed on Feb. 4, 2011, and designating the U.S., the entire contents of which are incorporated herein by reference.

FIELD

The present invention relates to a communication system, a communication method, and a communication apparatus.

BACKGROUND

A link aggregation (hereafter, simply referred to as LAG) conforming with IEEE (Institute of Electrical and Electronic Engineers) 802.3ad has been known. The LAG is standardized as a technology for ensuring bandwidth of the transmission paths that form a network by a use of a plurality of physical links (physical lines) aggregated into one logic link (logic line). Further, in recent years, the LAG has been widely employed as a technology for ensuring redundancy in the transmission path.

However, while being able to cope with a failure that has occurred on a path that forms a transmission path by ensuring redundancy of the transmission path, the LAG is unable to cope with the failure that has occurred in a communication node that is a communication apparatus such as a switch and the like forming the network. Therefore, the MC-LAG (Multi-chassis LAG) has been proposed in which the LAG is applied with the technology for ensuring the redundancy of the communication node such as the Split Multi-Link trunking, the vPC (virtual Port Channel), and the like (refer to, for example, Non-patent Literature 1, Non-patent Literature 2, and Non-patent Literature 3). The MC-LAG is a technology for both ensuring the redundancy of the transmission path of one side (an access network side described later) and ensuring the redundancy in the communication node.

The MC-LAG will be described below. FIG. 25 is a schematic diagram illustrating the configuration of a network built with the MC-LAG. A network 100 illustrated in FIG. 25 is formed with an access network 107A accommodating a communication node 102A, an access network 107B accommodating a communication node 102B, and a core network 108.

In the network 100, a communication node group 103A is located in the boundary between the access network 107A and the core network 108, and a communication node group 103B is located in the boundary between the access network 107B and the core network 108. The communication node group 103A includes communication nodes 110A and 110B (hereafter, referred to as boundary node(s)) that mutually monitor their states. Similarly, communication node group 103B includes boundary nodes 110C and 110D that mutually monitor their states. It is noted that the communication node group includes a plurality of logically integrated boundary nodes and thus operates as if it were one boundary node.

The communication node 102A and the communication node group 103A are connected by the LAG by a path connecting the communication node 102A to the boundary node 110A and a path connecting the communication node 102A to the boundary node 110B. In the connection between the communication node 102A and the communication node group 103A, either one of these two paths is used as an active path and the other is used as a backup path according to the control by the LACP (Link Aggregation Control Protocol).

Similarly, the communication node 102B and the communication node group 103B are connected by the LAG by a path connecting the communication node 102B to the boundary node 110C and a path connecting the communication node 102B to the boundary node 110D. In the connection between communication node 102B and the communication node group 103B, either one of these two paths is used as an active path and the other is used as a backup path.

Further, the communication node group 103A and the communication node group 103B are connected by four VLAN (Virtual Local Area Network) paths. The four VLAN paths include a path 104A, a path 104B, a path 104C, and a path 104D. The path 104A is a VLAN path connecting the boundary node 110A to the boundary node 110C. The path 104B is a VLAN path connecting the boundary node 110A to the boundary node 110D. The path 104C is a VLAN path connecting the boundary node 110B to the boundary node 110C. The path 104D is a VLAN path connecting the boundary node 110B to the boundary node 110D. In the connection between the communication node group 103A and the communication node group 103B, either one of these four VLAN paths is used as an active path and the remaining paths are used as backup paths according to the control by the LDP (Link Distribution Protocol).

For example, when there is no failure occurring in any of the boundary nodes 110A to 110D and the paths 104A to 104D, the communication nodes 102A and 102B communicate using the VLAN path routing the boundary node 110A, the path 104A, and the boundary node 110C as the active path.

Here, it is assumed that a failure occurs in the boundary node 110C, for example. In this case, the communication node groups 103A and 103B and the communication node 102B select the backup path routing the boundary node 110A, the path 104B, and the boundary node 110D as the VLAN path connecting the communication nodes 102A and 102B according to the control by the LDP. The communication nodes 102A and 102B switch the path to the selected backup path and start a communication. As a result, the communication nodes 102A and 102B are able to avoid the disconnection of the communication due to the failure of the boundary node 110C.

Further, because the MC-LAG is a technology in which the LAG implementing the link redundancy is expanded, the link redundancy of the access network side in FIG. 25 is also implemented. For example, when a failure occurs in the link between the communication node 102B and the boundary node 110C, the link between the communication node 102B and the boundary node 110D is turned to be active and also the boundary node is switched from 110C to 110D. This allows the communication node 102B to maintain the connection to the core network 108 even when a failure occurs in the link of the access network 107B side.

Patent Literature 1: Japanese Laid-open Patent Publication No. 2008-11082

Patent Literature 2: Japanese Laid-open Patent Publication No. 2008-78893

Patent Literature 3: Japanese Laid-open Patent Publication No. 2002-232427

Non Patent Literature 1: "draft-ietf-pwe3-redundancy-02.txt", online, searched on Oct. 25, 2008, URL <http://tools.ietf.org/wg/pwe3/draft-ietf-pwe3-redundancy/draft-ietf-pwe3-redundancy-03-from-02.wdiff.html>

Non Patent Literature 2: "draft-ietf-pwe3-redundancy-bit-02.txt", online, searched on Oct. 25, 2008, URL <http://tools.ietf.org/wg/pwe3/draft-ietf-pwe3-iccp/draft-ietf-pwe3-iccp-02-from-01.diff.html>

Non Patent Literature 3: "draft-ietf-pwe3-iccp-02.txt", online, searched on Oct. 25, 2008, URL <http://tools.ietf.org/wg/pwe3/draft-ietf-pwe3-iccp/draft-ietf-pwe3-iccp-02-from-01.diff.html>

Non Patent Literature 4: "Split Multi-Link Trunking", online, searched on Oct. 25, 2008, URL <http://en.wikipedia.org/wiki/Split multi-link trunking>

In the network 100 illustrated in FIG. 25, however, no mechanism for implementing the redundancy of the paths 104A to 104D in the core network 108 side is provided. Thus, in general, the redundancy of the paths 104A to 104D is implemented by providing two paths each between opposing boundary nodes 110 in the core network 108 side. That is, in FIG. 25, two paths need to be provided to each of the paths 104A, 104B, 104C, and 104D, which therefore requires eight paths in total. Thus, there is a problem of the increased line cost.

One of the aspects of the present technique is to provide a communication system, a communication method, and a communication apparatus that allows for implementing the redundancy to the path in the configuration in which one path is provided between each pair of the opposing boundary nodes in the core network side.

SUMMARY

According to an aspect of an embodiment of the invention, a communication system has a first communication apparatus and a second communication apparatus, and a third communication apparatus and a fourth communication apparatus provided opposing to the first communication apparatus and the second communication apparatus with connected by logic line paths. The first communication apparatus includes a notification unit adapted to use a second path connected to the fourth communication apparatus and to notify the fourth communication apparatus of state information indicating a state of a first path connected to the third communication apparatus. The third communication apparatus includes a notification unit adapted to use a third path connected to the fourth communication apparatus and to notify the second communication apparatus of state information indicating a state of the first path. The second communication apparatus and the fourth communication apparatus include an exchanging unit adapted to use a fourth path connected between the second communication apparatus and the fourth communication apparatus and to exchange the state information notified from the first communication apparatus with the state information notified from the third communication apparatus. The second communication apparatus and the fourth communication apparatus include a switching unit adapted to, when the state information notified from the first communication apparatus and the state information notified from the third communication apparatus are information indicating a failure state of the first path that is an active path and when the self apparatus is one responsible for a switching, switch the active path to a backup path that is the second path or the third path connected to the self apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a schematic diagram illustrating an example of a network configuration of a relay system of a first embodiment.

FIG. 2 is a schematic diagram illustrating an example of a group configuration of the relay system of the first embodiment.

FIG. 6 is a schematic diagram illustrating an example of a path information table.

FIG. 7 is a schematic diagram illustrating an example of an LAG management table.

FIG. 9 is a schematic diagram illustrating an example of an inter-boundary node path management table.

FIG. 12 is a schematic diagram illustrating an example of a group configuration of the relay system of the second embodiment.

FIG. 13 is a schematic diagram illustrating an example of an inter-boundary node path management table of the second embodiment.

DESCRIPTION OF EMBODIMENTS

Figure 3:
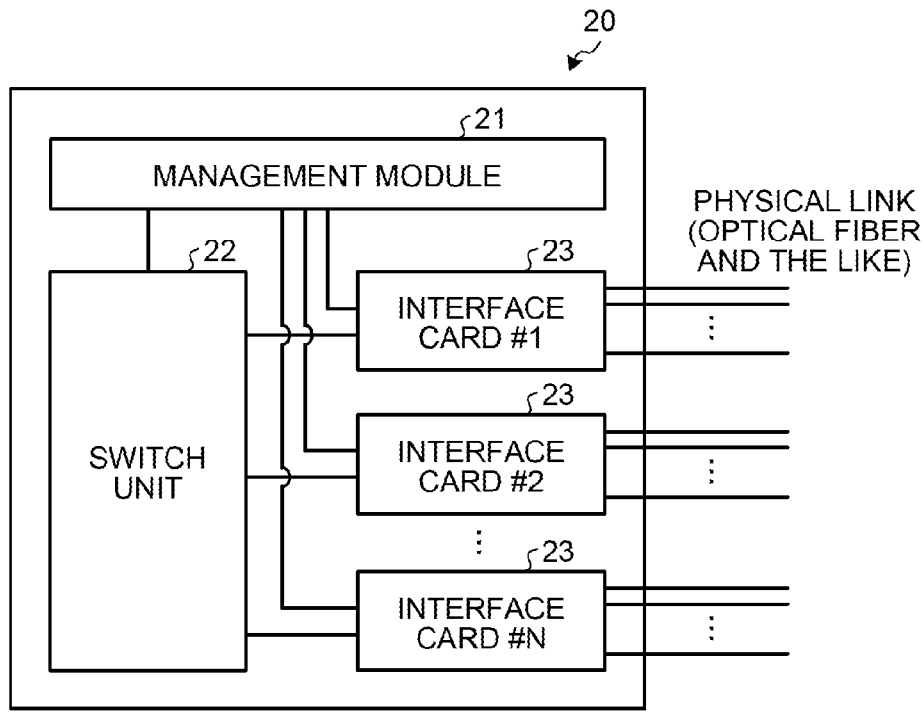
FIG. 3 is a block diagram illustrating an example of a hardware configuration of a switch apparatus.

Preferred embodiments of the present invention will be explained with reference to accompanying drawings. In addition, the embodiments do not limit the technique disclosed herein.

Embodiments of a communication system, a communication method, and a communication apparatus disclosed in the present application will be described below in detail based on the drawings. It is noted that the disclosed technique is not limited by the embodiments. It is noted that, in the following embodiments, the network built with the MC-LAG will be described as a relay system adapted to relay the communication between opposing communication nodes. In the network built with the MC-LAG, the paths for link connection between the communication nodes that are the communication apparatus such as switches forming the network is formed by the LAG.

First Embodiment

FIG. 1 is a schematic diagram illustrating an example of a network configuration of a relay system of the first embodiment. A relay system 1 illustrated in FIG. 1 has an access network 7A accommodating a communication node 2A (2), an access network 7B accommodating a communication node 2B (2), and a core network 8 connecting the access network 7A to the access network 7B. Further, the relay system 1 has a boundary node group 3A located between the access network 7A and the core network 8 and connected to the communication node 2A. Further, the relay system 1 has a boundary node group 3B located between the access network 7B and the core network 8 and connected to the communication node 2B. Further, the relay system 1 uses VLAN paths 4 that are logic lines between the boundary node group 3A and the boundary node group 3B to relay the traffic between the communication nodes 2A and 2B in an interactive manner. In the relay system 1, the boundary node groups 3A and 3B are opposing to each other and therefore the communication node 2A connected to the boundary node group 3A and the communication node 2B connected to the boundary node group 3B are opposing to each other.

The boundary node group 3A and the boundary node group 3B include a boundary node 10 as a communication apparatus. The boundary node group 3A has a first boundary node 10A and a second boundary node 10B. The boundary node group 3B in the opposite side has a third boundary node 10C and a fourth boundary node 10D. In the relay system 1, the first boundary node 10A and the second boundary node 10B in the boundary node group 3A and the third boundary node 10C and the fourth boundary node 10D in the boundary node group 3B in the opposite side are connected to each other by four VLAN (Virtual Local Area Network) paths 4. The VLAN paths 4 are logic transmission paths formed with the logic link connected between two boundary node groups 3A and 3B, and relay the traffic for the communications between the boundary nodes 10 included in each of the boundary node groups 3A and 3B. The VLAN paths 4 include a first VLAN path 4A, a second VLAN path 4B, a third VLAN path 4C, and a fourth VLAN path 4D. The first VLAN path 4A is a path that provides a link connection between the first boundary node 10A and the third boundary node 10C. The second VLAN path 4B is a path that provides a link connection between the first boundary node 10A and the fourth boundary node 10D. The third VLAN path 4C is a path that provides a link connection between the third boundary node 10C and the second boundary node 10B. The fourth VLAN path 4D is a path that provides a link connection between the second boundary node 10B and the fourth boundary node 10D.

The communication node 2A is connected to the first boundary node 10A and the second boundary node 10B in the boundary node group 3A by using the LAG conforming with IEEE 802.3ag. The communication node 2A is operated under the setting that the link connection to the first boundary node 10A is in an active state while the link connection to the second boundary node 10B is in a standby state. Also, similarly, the communication node 2B is connected to the third boundary node 10C and the fourth boundary node 10D in the boundary node group 3B by using the LAG. The communication node 2B is operated under the setting that the link connection to the third boundary node 10C is in an active state while the link connection to the fourth boundary node 10D is in a standby state.

In the relay system 1, the four of the first VLAN path 4A to the fourth VLAN path 4D are managed in two protection groups (hereafter, simply referred to as "group(s)"). FIG. 2 is a schematic diagram illustrating an example of the group configuration of the relay system 1 of the first embodiment. In the first group illustrated in FIG. 2, the first VLAN path 4A between the first boundary node 10A and the third boundary node 10C is managed as the active VLAN path 4. Further, in the first group, the second VLAN path 4B between the first boundary node 10A and the fourth boundary node 10D is managed as the backup VLAN path 4. Also, in the second group, the first VLAN path 4A between the third boundary node 10C and the first boundary node 10A is managed as the active VLAN path 4. Further, in the second group, the third VLAN path 4C between the third boundary node 10C and the second boundary node 10B is managed as the backup VLAN path 4.

Further, the first boundary node 10A uses the second VLAN path 4B to transmit, to the fourth boundary node 10D, the APS (Automatic Protection Switching) packet in which the state of the first group is stored. It is noted that the APS packet is defined under the Ethernet™ linear protection of G.8031 of the ITU-T (International Telecommunication Union Telecommunications Standardization Sector) Recommendation. The group is made of a set of the active VLAN path 4 and the backup VLAN path 4. The boundary node 10 belonging to the group uses a backup VLAN path 4 within its own group to regularly transmit and receive the APS packet in which the state of the group is stored.

Further, the APS packet is a packet capsuled within a frame including a source MAC address (SMAC), a destination multicast MAC address (DMAC), a VLAN path identifier (VLAN ID), a type class, and so on. The VLAN path identifier corresponds to an identifier for identifying the backup VLAN path 4 included in the header information. The type class is a type classification of the service OAM (S-OAM: Service Operation Administration Maintenance), that is, the S-OAM type of "APS". Further, the state information of the group is stored in the payload part of the APS packet.

The state information of the group includes, for example, "NR", "SF-W", "SF-P", "FS", and so on. NR (No Request) represents that the VLAN path 4 managed by the group is in a normal state, that is, a state that there is no failure. SF-W (Signal Failure-Working) represents a state that a failure occurs on an active VLAN path 4 managed by the group. SF-P (Signal Failure-Protection) represents a state that a failure occurs on a backup VLAN path 4 managed by the group. It is noted that SF-P is used when failures occur in an active VLAN path 4 and a backup VLAN path 4 managed by the group, that is, failures occur in both systems. FS (Forced Switching) represents a state that there is a manual switching operation to the VLAN path 4 managed by the group.

Also, the third boundary node 10C uses the backup third VLAN path 4C to transmit, to the second boundary node 10B, the APS packet in which the state of the second group is stored. Further, the second boundary node 10B uses the fourth VLAN path 4D to transmit, to the fourth boundary node 10D, the APS packet in which the state of the second group is stored. Similarly, the fourth boundary node 10D uses the fourth VLAN path 4D to transmit, to the second boundary node 10B, the APS packet in which the state of the first group is stored. That is, the second boundary node 10B and the fourth boundary node 10D use the fourth VLAN path 4D to mutually exchange the states of the first group and the second group. As a result, using the fourth VLAN path 4D to mutually exchange the APS packets, the second boundary node 10B and the fourth boundary node 10D can recognize the state information about the first group and the second group. It is noted that, although the APS packet is used for the transmission of the state information, other transmission message system may also be used.

Also, one of the second boundary node 10B and the fourth boundary node 10D is set as a master, and the other is set as the slave. The determination of the master and the slave is made utilizing the value of the source MAC address used in the APS packet exchange between the second boundary node 10B and the fourth boundary node 10D. For example, in the relay system 1, the boundary node 10 which has the larger value of the source MAC address is determined to be the master, and the boundary node 10 which has the smaller value of the source MAC address is determined to be the slave. It is noted that, for convenience sake, it is assumed that the second boundary node 10B is the master and the fourth boundary node 10D is the slave in the present embodiment.

Next, the communication node 2 and the boundary node 10 will be described. For the communication node 2 and the boundary node 10, the Ethernet™ switch apparatus such as the chassis-type switch, the router, and the like (hereafter, simply referred to as switch apparatus) is used. FIG. 3 is a block diagram illustrating an example of the hardware configuration of a switch apparatus. A switch apparatus 20 illustrated in FIG. 3 has a management module 21, a switch unit 22, and interface cards 23. The management module 21 controls the entire switch apparatus 20 and manages the state of the switch apparatus itself based on the control information such as the APS packet. The switch unit 22 processes the switching of the interface cards 23 used for the packet communication. Each interface card 23 has a plurality of ports adapted to input and output the packet, and is connected to the physical link such as an optical fiber cable, the LAN cable, and the like.

Figure 4:
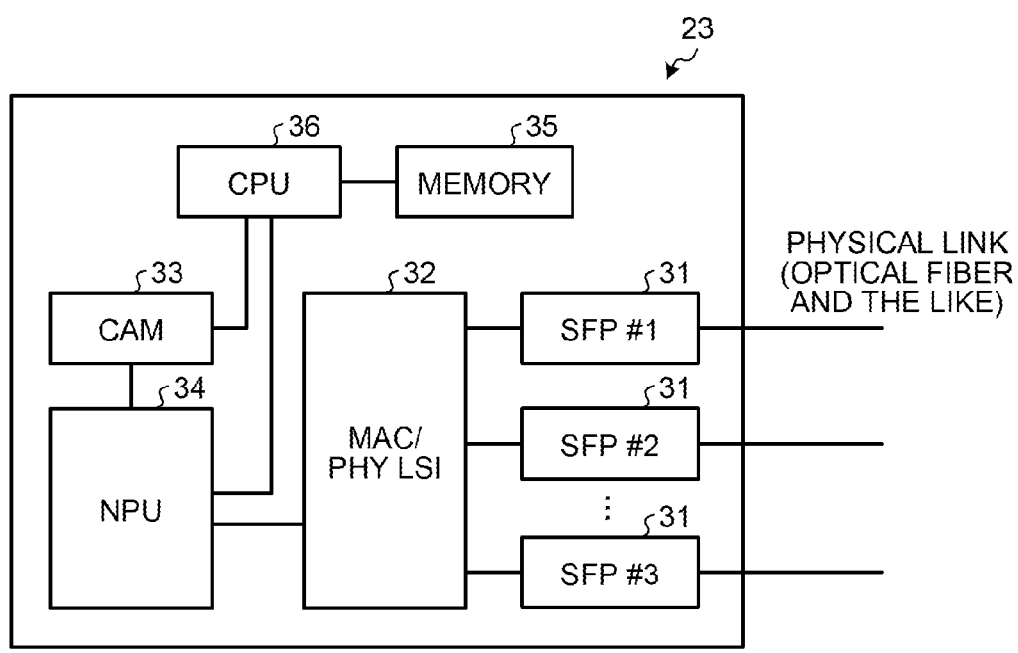
FIG. 4 is a block diagram illustrating an example of a hardware configuration of an interface card.

FIG. 4 is a block diagram illustrating an example of the hardware configuration of the interface card 23. The interface card 23 illustrated in FIG. 4 has a plurality of SFPs (Small Form Factor Pluggable) 31, an MAC/PHY LSI (Media Access Control/PHYsical Large Scale Integration) 32, and a CAM (Content Addressable Memory) 33. Further, the interface card 23 has an NPU (Network Processor Unit) 34, a memory 35, and a CPU (Central Processing Unit) 36.

When connected to an optical fiber cable, the SFP 31 serves as an optical module adapted to convert an optical signal into an electrical signal and convert the electrical signal into the optical signal. It is noted that, for example, when connected to the LAN cable that transmits the electrical signal such as RJ-45 and the like, the SFP 31 serves as the LAN interface adapted to perform the conversion of the protocol of the Ethernet™.

The MAC/PHY LSI 32 is an interface between the physical layer that is the Layer 1 of the OSI (Open System Interconnection) reference model and the MAC layer that is the Layer 2. Specifically, the MAC/PHY LSI 32 recovers the MAC frame from the input signal that is the electrical signal and extracts the header information from the MAC frame. Further, the MAC/PHY LSI 32 decapsules the MAC frame to extract the packet and notifies the NPU 34 of the extracted packet. Also, the MAC/PHY LSI 32 adds the header information to the packet that is the output signal to generate the MAC frame and converts the generated MAC frame into the electrical signal to output it to the SFP 31. The CAM 33 stores the output destination information corresponding to the MAC address of the header information within the packet.

The NPU 34 executes the relaying process in the upper layer on and above the Layer 3 of the OSI reference model. After extracting the destination MAC address from the header information in the packet, the NPU 34 extracts the output destination information corresponding to the destination MAC address from the CAM 33. Further, the NPU 34 determines the output port based on the extracted output destination information. Also, the NPU 34 transfers the control information such as the packet destined to the self apparatus, the APS packet, and the like to the CPU 36. The CPU 36 manages the NPU 34 and the like, executes the process regarding the received APS packet, and changes the output destination information stored in the CAM 33. The memory 35 corresponds to the DRAM (Dynamic Access Random Memory) and the like, for example, and is utilized as the storage area for the program executed by the CPU 36 and/or the management data.

Figure 5:
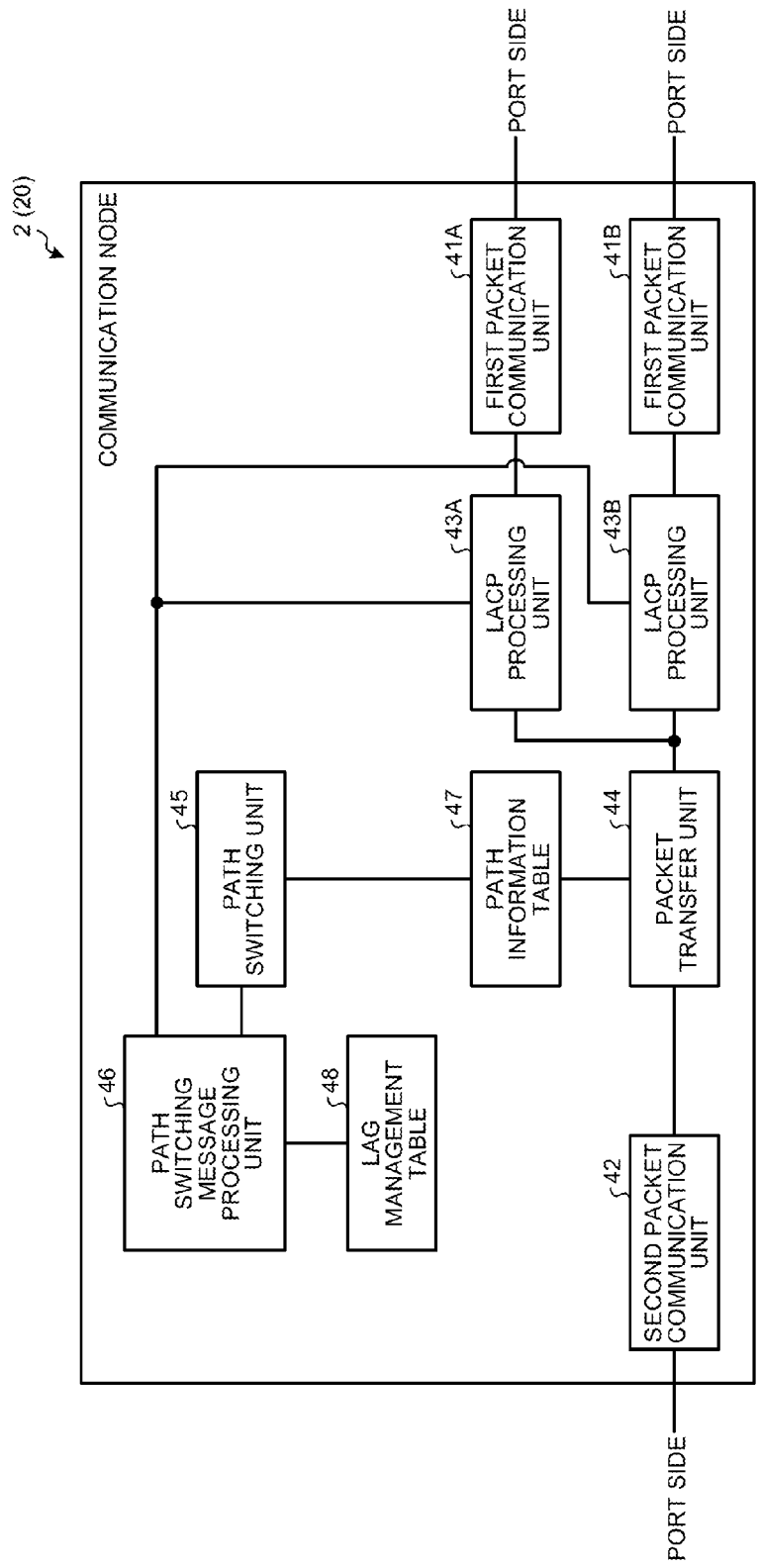
FIG. 5 is a block diagram illustrating an example of a functional configuration of a communication node.

Next, the functional configuration of the communication node 2 will be described. FIG. 5 is a block diagram illustrating an example of the functional configuration of the communication node 2. The communication node 2 illustrated in FIG. 5 has first packet communication units 41A and 41B, a second packet communication unit 42, LACP (Link Aggregation Control Protocol) processing units 43A and 43B, a packet transfer unit 44, and a path switching unit 45. Further, the communication node 2 has a path switching message processing unit 46, a path information table 47, and an LAG management table 48. The first packet communication units 41A and 41B are link-connected to the boundary node 10 by the LAG, and transmit and receive the packet. For example, in the case of the communication node 2A, the first packet communication unit 41A is connected to the first boundary node 10A. Also, the first packet communication unit 41B is connected to the second boundary node 10B. Also, the second packet communication unit 42 is connected to the not-illustrated network that is different from the boundary node 10, and transmits and receives the packet.

The LACP processing units 43A and 43B extract the LACP packets from the packets received at the first packet communication units 41A and 41B, respectively. It is noted that the LACP packet is a control packet for controlling the link state of the LAG. For example, when the link connection between the communication node 2 and the boundary node 10 is set to the active state, the LACP packet in which "IN SYNC" is stored is used. Also, when the link connection is set to the standby state, the LACP packet in which "OUT OF SYNC" is stored is used. Also, the LACP processing units 43A and 43B notify the path switching message processing unit 46 of the extracted LACP packet. Also, the LACP processing units 43A and 43B transmit the LACP packet generated at the path switching message processing unit 46 to the boundary node 10 through the first packet communication units 41A and 41B.

The path information table 47 manages the port of the communication node 2 and the path information of the VLAN path 4 used in the packet communication. FIG. 6 is a schematic diagram illustrating an example of the path information table 47. The path information table 47 illustrated in FIG. 6 stores associating a reception port number 47A, a reception VLAN ID (VLAN identifier) 47B, a transmission port number 47C, and a transmission VLAN ID 47D. It is noted that the reception port number 47A is a number for identifying the port used when the packet is received at the communication node 2. The reception VLAN ID 47B is a number for identifying the VLAN path 4 used when the communication node 2 receives the packet. The transmission port number 47C is a number for identifying the port used when the packet is transmitted at the communication node 2. The transmission VLAN ID 47D is a number for identifying the VLAN path 4 used when the communication node 2 transmits the packet.

The packet transfer unit 44 refers to the path information table 47 to transfer the packet from the first packet communication unit 41A or 41B, or the second packet communication unit 42 and transfer the packet to the first packet communication unit 41A or 41B, or the second packet communication unit 42. For example, the packet transfer unit 44 extracts the reception VLAN ID 47B from the header information of the packet received via the first packet communication unit 41A or 41B, or the second packet communication unit 42. The packet transfer unit 44 then extracts, from the path information table 47, the transmission port number 47C associated with the transmission VLAN ID 47D having the same value as the extracted reception VLAN ID 47B. The packet transfer unit 44 transfers the packet to the port of the extracted transmission port number 47C.

Also, the LAG management table 48 manages the link state indicating the state of the link connection of the LAG of the communication node 2. FIG. 7 is a schematic diagram illustrating an example of the LAG management table 48. The LAG management table 48 stores an LAG number 48A, a port number 48B, and a link state 48C associated to each other. It is noted that the LAG number 48A is a number for identifying the LAG connected to the communication node 2. The port number 48B is a number for identifying the port connected to the LAG associated with the LAG number. It is noted that, in the case of the communication node 2A, for example, the port number 48B includes the number for identifying the port connected to the first boundary node 10A and the number for identifying the port connected to the second boundary node 10B. The link state 48C represents the link state of the LAG, for example, the standby state (Standby) or the active state (Active). It is noted that the active state corresponds to the state of the VLAN that is being used in the communication while the link connection is activated, that is, the active state. The standby state corresponds to the state of the VLAN that is released in the communication while the link connection is deactivated, that is, the backup state.

The path switching message processing unit 46 updates the link state 48C of the LAG management table 48 based on the LACP packet extracted at the LACP processing units 43A and 43B. Also, based on the content of the table of the LAG management table 48, the path switching message processing unit 46 determines the path to the boundary node 10 that is link-connected to the LAG. The path switching unit 45 updates the content of the table of the path information table 47 based on the path determined at the path switching message processing unit 46.

It is noted that, when the communication node 2 illustrated in FIG. 5 is the switch apparatus 20 illustrated in FIG. 3, the first packet communication units 41A and 41B, the second packet communication unit 42, the LACP processing units 43A and 43B, and the packet transfer unit 44 correspond to the NPU 34 illustrated in FIG. 4, for example. Further, the path information table 47 corresponds to the CAM 33 illustrated in FIG. 4, for example. The LAG management table 48 corresponds to the memory 35 illustrated in FIG. 4, for example. The path switching message processing unit 46 and the path switching unit 45 correspond to the CPU 36, for example.

Figure 8:
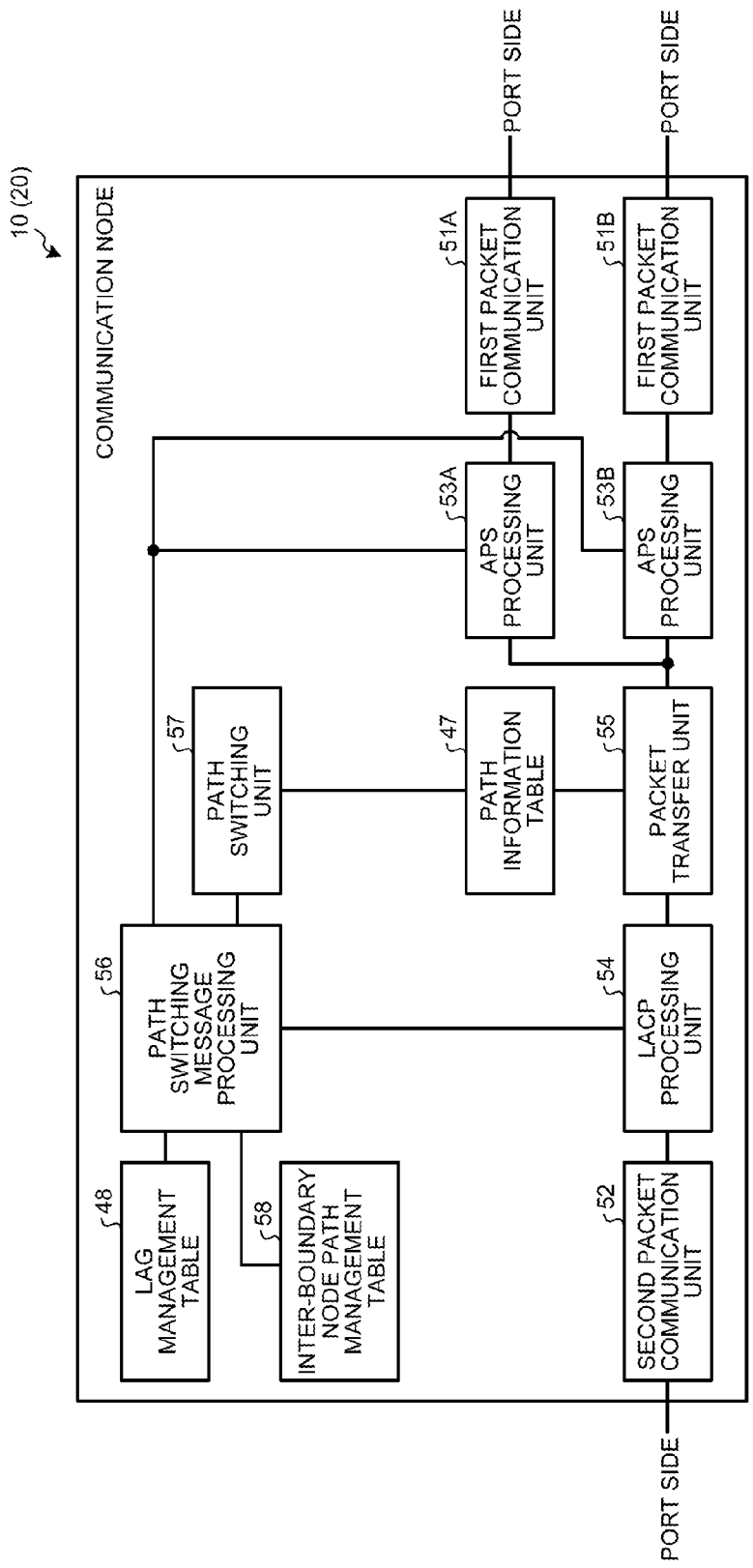
FIG. 8 is a block diagram illustrating an example of a functional configuration of a boundary node.

Next, the functional configuration of the boundary node 10 will be described. FIG. 8 is a schematic diagram illustrating an example of the functional configuration of the boundary node 10. The boundary node 10 illustrated in FIG. 8 has first packet communication units 51A and 52B, a second packet communication unit 52, APS processing units 53A and 53B, an LACP processing unit 54, and a packet transfer unit 55. The boundary node 10 has a path switching message processing unit 56 and a path switching unit 57. Further, the boundary node 10 has the path information table 47, the LAG management table 48, and an inter-boundary node path management table 58.

The first packet communication units 51A and 51B are connected to the VLAN path 4. For example, in the case of the first boundary node 10A, the first packet communication unit 51A is connected to the first VLAN path 4A. Also, the first packet communication unit 51B is connected to the fourth VLAN path 4D. Also, the second packet communication unit 52 is connected to the communication node 2. For example, in the case of the first boundary node 10A, the second packet communication unit 52 is connected to the communication node 2A, and transmits and receives the packet to and from the communication node 2A.

The LACP processing unit 54 extracts the LACP packet from the packet received by the second packet communication unit 52. The LACP processing unit 54 notifies the path switching message processing unit 56 of the extracted LACP packet. Further, the LACP processing unit 54 transmits the LACP packet generated at the path switching message processing unit 56 to the communication node 2 through the second packet communication unit 52.

The APS processing units 53A and 53B extract the APS packets from the packets received by the first packet communication units 51A and 51B, respectively. It is noted that the APS packet is transmitted using the backup VLAN path 4 and stores, for example, the state information such as "NR", "SF-W", "SF-P", "FS", and the like, as described above. The APS processing units 53A and 53B notify the path switching message processing unit 56 of the extracted APS packet. Also, the APS processing units 53A and 53B store the state information generated at the path switching message processing unit 56 in the APS packet. Further, the APS processing units 53A and 53B transmit the APS packet in which the state information is stored to the opposite side boundary node 10 through the first packet communication units 51A and 51B.

The path information table 47 manages the port and the path information of the VLAN path 4 that the boundary node 10 uses in the packet communication. It is noted that the reception port number 47A illustrated in FIG. 6 is a number for identifying the port that the boundary node 10 uses in the reception of the packet. The reception VLAN ID 47B is a number for identifying the VLAN path 4 that the boundary node 10 uses in the reception of the packet. The transmission port number 47C is a number for identifying the port that the boundary node 10 uses in the transmission of the packet. The transmission VLAN ID 47D is a number for identifying the VLAN path 4 that the boundary node 10 uses in the transmission of the packet.

The packet transfer unit 55 refers to the path information table 47 to transfer the packet from the first packet communication unit 51A or 51B, or the second packet communication unit 52 and transfer the packet to the first packet communication unit 51A or 51B, or the second packet communication unit 52. For example, the packet transfer unit 55 extracts the reception VLAN ID 47B from the header information of the packet received via the first packet communication unit 51A or 51B, or the second packet communication unit 52. The packet transfer unit 55 then extracts, from the path information table 47, the transmission port number 47C associated with the transmission VLAN ID 47D that is the same as the extracted reception VLAN ID 47B. The packet transfer unit 55 transfers the packet to the port of the extracted transmission port number 47C.

The LAG management table 48 manages the link state of the LAG by which the boundary node 10 is link-connected to the communication node 2. For example, in the case of the first boundary node 10A, the port number 48B illustrated in FIG. 7 corresponds to the number that identifies the port to be link-connected to the communication node 2A.

The inter-boundary node path management table 58 manages access network side VLAN information 58A and core network side VLAN information 58B of the boundary node 10. The access network side VLAN information 58A is an identifier for identifying the VLAN path through which the boundary node 10 is connected to the communication node 2. The core network side VLAN information 58B illustrated in FIG. 9 includes active VLAN information 581, backup VLAN information 582, and a protection state 583. Further, the active VLAN information 581 manages associating a VLAN identifier 581A that identifies the active VLAN path 4 to which the boundary node 10 is connected with a transmission port number 581B that identifies the port to be connected to the active VLAN path 4. Further, the backup VLAN information 582 manages associating a VLAN identifier 582A that identifies the backup VLAN path 4 to which the boundary node 10 is connected and a transmission port number 582B that identifies the port to be connected to the backup VLAN path 4. The protection state 583 is the state information of the VLAN path 4 of the core network 8 side connected to the boundary node 10, for example, the state information such as NR, SF-W, SF-P, FS, and the like.

For example, in the case of the first boundary node 10A belonging to the first group, in the access network side VLAN information 58A, managed is the VLAN identifier for identifying the VLAN path to the communication node 2A connected to the first boundary node 10A. Further, in the active VLAN information 581, managed is the VLAN identifier 581A that has identified the first VLAN path 4A between the first boundary node 10A and the third boundary node 10C that the first group to which the first boundary node 10A belongs uses as the active one. Further, in the backup VLAN information 582, managed is the VLAN identifier 582A that has identified the second VLAN path 4B between the first boundary node 10A and the fourth boundary node 10D that the first group uses as the backup one. Further, in the protection state 583, the state information of the first group, for example, NR is managed.

The path switching message processing unit 56 updates the link state 48C and the like of the LAG in the LAG management table 48 based on the LACP packet extracted by the LACP processing unit 54. Also, the path switching message processing unit 56 refers to the content of the table of the LAG management table 48 to determine the path to the communication node 2 link-connected to the LAG. The path switching message processing unit 56 recognizes the state information of the group based on the APS packet extracted by the APS processing units 53A and 53B. Further, in response to the recognition of the state information of the group, the path switching message processing unit 56 updates the protection state 583 and so on of the inter-boundary node path management table 58. Further, the path switching message processing unit 56 refers to the content of the table of the inter-boundary node path management table 58 to determine the path to the boundary node 10 link-connected to the VLAN path 4 that relays the traffic. The path switching unit 57 updates the content of the table in the path information table 47.

It is noted that the APS processing units 53A and 53B of the first boundary node 10A store the state of the first VLAN path 4A in the APS packet as the state of the first group. The APS processing units 53A and 53B of the first boundary node 10A then transmits, to the fourth boundary node 10D, the APS packet in which the state of the first group is stored. Also, the APS processing units 53A and 53B of the third boundary node 10C store the state of the first VLAN path 4A in the APS packet as the state of the second group. The APS processing units 53A and 53B of the third boundary node 10C then transmits, to the second boundary node 10B, the APS packet in which the state of the second group is stored. Also, the APS processing units 53A and 53B of the third boundary node 10C and the fourth boundary node 10D use the fourth VLAN path 4D to exchange the APS packet in which the states of the first group and the second group are stored. The path switching message processing units 56 of the second boundary node 10B and the fourth boundary node 10D switch the first VLAN path 4A to the backup VLAN path 4 to be connected, when both states of the first group and the second group are SF-W and the self apparatus is the master. Therefore, the path switching message processing units 56 of the second boundary node 10B and the fourth boundary node 10D reflect, into the inter-boundary node path management table 58 and the path information table 47, the information in switching the active first VLAN path 4A to the backup VLAN path 4 to be connected to the self apparatus. The packet transfer units 55 of the second boundary node 10B and the fourth boundary node 10D switch the active VLAN path 4 to the backup VLAN path 4 based on the path information table 47.

It is noted that, when the boundary node 10 illustrated in FIG. 8 is the switch apparatus 20 illustrated in FIG. 3, the first packet communication units 51A and 51B, the second packet communication unit 52, and the APS processing units 53A and 53B correspond to the NPU 34 illustrated in FIG. 4, for example. Further, the LACP processing unit 54 and the packet transfer unit 55 correspond to the NPU 34 illustrated in FIG. 4, for example. Also, the path information table 47 corresponds to the CAM 33 illustrated in FIG. 4, for example. Also, the LAG management table 48 and the inter-boundary node path management table 58 correspond to the memory 35 illustrated in FIG. 4, for example. Also, the path switching message processing unit 56 and the path switching unit 57 correspond to the CPU 36, for example.

In the relay system 1, the core network side VLAN information 58B of each inter-boundary node path management table 58 in each of the boundary nodes 10A to 10D is grouped and managed for each VLAN path 4. Further, in the relay system 1, the APS processing units 53A and 53B in each of the boundary nodes 10A to 10D exchange, on each backup VLAN path 4, the APS packet in which the state information of each group is stored.

Then, the path switching message processing unit 56 in each of the boundary nodes 10A to 10D collects the APS packet of each group through the APS processing units 53A and 53B and recognizes the state information of the first group and the second group. Further, the path switching message processing unit 56 in each of the boundary nodes 10A to 10D determines the VLAN path 4 used for the traffic relay between the communication node 2A and the communication node 2B based on the state information of the first group and the second group.

The path switching unit 57 in each of the boundary nodes 10A to 10D updates, to the inter-boundary node path management table 58 and the path information table 47, the information of the VLAN path 4 used for the determined traffic relay. The packet transfer unit 55 of each of the boundary nodes 10A to 10D then switches the VLAN path 4 used for the traffic relay based on the content of the table in the inter-boundary node path management table 58 and the path information table 47.

Figure 10:
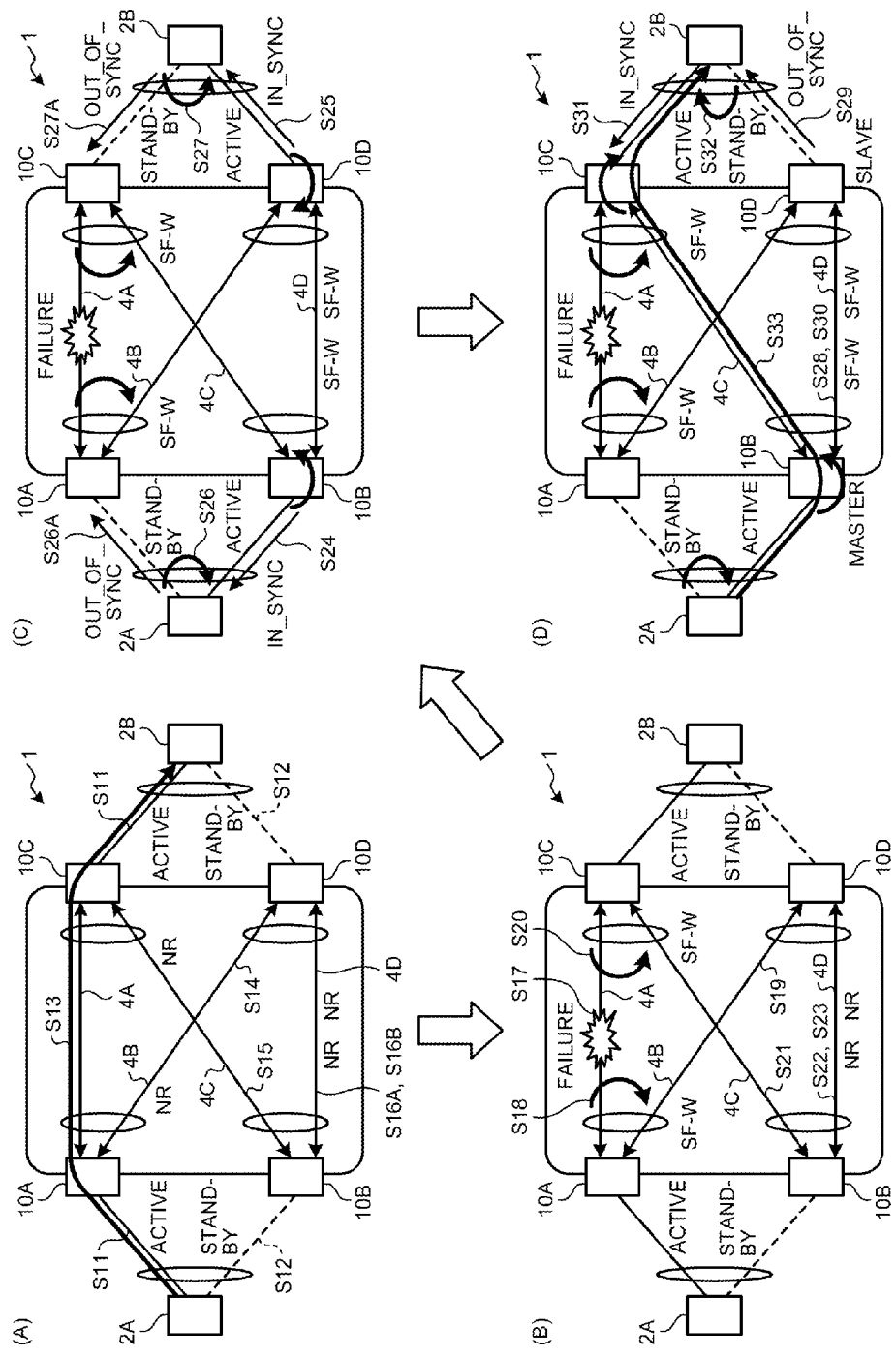
FIG. 10 is a schematic diagram illustrating a processing operation of the relay system with respect to the time of a failure in an active VLAN path in the first embodiment.

Next, the operation of the relay system 1 of the first embodiment will be described. FIG. 10 is a schematic diagram illustrating the processing operation of the relay system 1 with respect to the time of a failure in the active VLAN path 4 in the first embodiment. In the relay system 1 under a normal state illustrated in FIG. 10(A), it is assumed that there is no failure and that the first VLAN path 4A between the first boundary node 10A and the third boundary node 10C is used as the active one.

The first boundary node 10A illustrated in FIG. 10(A) sets the link connection with the communication node 2A to the active state and the third boundary node 10C sets the link connection with the communication node 2B to the active state (step S11). As a result, the first boundary node 10A and the third boundary node 10C use the active first VLAN path 4A to relay the traffic between the communication node 2A and the communication node 2B.

Also, the second boundary node 10B sets the link connection with the communication node 2A to the standby state and the fourth boundary node 10D sets the link connection with the communication node 2B to the standby state (step S12). Therefore, the traffic between the communication node 2A and the communication node 2B is not relayed between the second boundary node 10B and the fourth boundary node 10D.

Also, the first boundary node 10A sets the first VLAN path 4A to the active state and uses the active first VLAN path 4A to allow the traffic to be relayed. Similarly, the third boundary node 10C sets the first VLAN path 4A to the active state and uses the active first VLAN path 4A to allow the traffic to be relayed. As a result, the first boundary node 10A and the third boundary node 10C use the first VLAN path 4A to relay the traffic between the communication node 2A and the communication node 2B (step S13).

At this time, the first boundary node 10A belonging to the first group stores the state of the first group, that is, NR representing the state of no failure in the APS packet. The first boundary node 10A then transmits the APS packet in which the state, NR, of the first group is stored to the fourth boundary node 10D via the second VLAN path 4B (step S14). Also, the third boundary node 10C belonging to the second group stores the state, NR, of the second group in the APS packet. The third boundary node 10C then transmits the APS packet in which the state, NR, of the second group is stored to the second boundary node 10B via the third VLAN path 4C (step S15).

Further, the fourth boundary node 10D belonging to the first group stores, in the APS packet, the new state, NR, of the first group and the previous state, NR, of the second group that has been received from the second boundary node 10B. The fourth boundary node 10D then transmits the APS packet in which both states, NR, of the first group and the second group are stored to the second boundary node 10B via the fourth VLAN path 4D (step S16A). Also, the second boundary node 10B belonging to the second group stores, in the APS packet, the new state, NR, of the second group and the previous state, NR, of the first group that has been received from the fourth boundary node 10D. The second boundary node 10B then transmits the APS packet in which both states, NR, of the first group and the second group are stored to the fourth boundary node 10D via the fourth VLAN path 4D (step S16B). That is, the second boundary node 10B and the fourth boundary node 10D exchange the APS packet in which both states, NR, of the first group and the second group are stored. It is noted that the first boundary node 10A to the fourth boundary node 10D use the backup VLAN paths 4 such as the second VLAN path 4B, the third VLAN path 4C, and the fourth VLAN path 4D, and periodically transmit and receive the APS packet in which the states of respective groups are stored. As a result, the second boundary node 10B and the fourth boundary node 10D are able to recognize both states, NR, of the first group and the second group.

In the relay system 1 illustrated in FIG. 10(B), it is assumed that a failure occurs in the active first VALN path 4A (step S17). In this case, the first boundary node 10A switches the VLAN path 4 in the active state from the active first VLAN path 4A to the backup second VLAN path 4B (step S18). As a result, the first boundary node 10A uses the second VLAN path 4B to relay the traffic. Then, the first boundary node 10A stores, in the APS packet, the state of the first group, that is, SF-W representing the failure state of the active first VLAN path 4A. The first boundary node 10A then transmits the APS packet in which the state, SF-W, of the first group is stored to the fourth boundary node 10D via the second VLAN path 4B (step S19).

Also, when detecting the failure of the first VLAN path 4A, the third boundary node 10C switches the VLAN path 4 in the active state from the active first VLAN path 4A to the backup third VLAN path 4C (step S20). As a result, the third boundary node 10C uses the third VLAN path 4C to relay the traffic. Then, the third boundary node 10C stores the state of the second group, SF-W, in the APS packet. The third boundary node 10C then transmits the APS packet in which the state, SF-W, of the second group is stored to the second boundary node 10B via the third VLAN path 4C (step S21).

Upon receiving the APS packet from the third boundary node 10C by using the third VLAN path 4C, the second boundary node 10B recognizes the state, SF-W, of the second group based on the APS packet. Further, in response that the state of the second group is recognized to be SF-W, the second boundary node 10B is changed to use the third VLAN path 4C to relay the traffic. Further, the second boundary node 10B stores, in the APS packet, the new state, SF-W, of the second group and the previous state, NR, of the first group that has been received from the fourth boundary node 10D. Further, the second boundary node 10B transmits the APS packet in which the state, NR, of the first group and the state, SF-W, of the second group are stored to the fourth boundary node 10D via the fourth VLAN path 4D (step S22).

Upon receiving the APS packet from the first boundary node 10A by using the second VLAN path 4B, the fourth boundary node 10D recognizes the state, SF-W, of the first group based on the APS packet. Further, in response that the state of the first group is recognized to be SF-W, the fourth boundary node 10D is changed to use the second VLAN path 4B to relay the traffic. The fourth boundary node 10D stores, in the APS packet, the new state, SF-W, of the first group and the previous state, NR, of the second group that has been received from the second boundary node 10B. Further, the fourth boundary node 10D transmits the APS packet in which the state, NR, of the first group and the state, SF-W, of the second group are stored to the second boundary node 10B via the fourth VLAN path 4D (step S23).

Upon transmitting the LACP packet in which "IN SYNC" is stored to the communication node 2A, the second boundary node 10B illustrated in FIG. 10(C) sets the link connection with the communication node 2A to the active state (step S24). As a result, the second boundary node 10B transfers the traffic received from the communication node 2A to the third VLAN path 4C and transfers the traffic received from the third VLAN path 4C to the communication node 2A.

Also, upon transmitting the LACP packet in which "IN SYNC" is stored to the communication node 2B, the fourth boundary node 10D sets the link connection with the communication node 2B to the active state (step S25). As a result, the fourth boundary node 10D transfers the traffic received from the communication node 2B to the second VLAN path 4B and transfers the traffic received from the second VLAN path 4B to the communication node 2B.

Also, the communication node 2A that has received the LACP packet of "IN SYNC" from the second boundary node 10B changes the link connection with the second boundary node 10B from the standby state to the active state. Further, the communication node 2A changes the link connection with the first boundary node 10A from the active state to the standby state and transmits to the first boundary node 10A the LACP packet in which "OUT OF SYNC" is stored (step S26A). As a result, the communication node 2A switches the path from the first boundary node 10A to the second boundary node 10B (step S26).

Also, the communication node 2B that has received the LACP packet of "IN SYNC" from the fourth boundary node 10D changes the link connection with the fourth boundary node 10D from the standby state to the active state. Further, the communication node 2B changes the link connection with the third boundary node 10C from the active state to the standby state and transmits to the third boundary node 10C the LACP packet in which "OUT OF SYNC" is stored (step S27A). As a result, the communication node 2B switches the path from the third boundary node 10C to the fourth boundary node 10D (step S27).

The second boundary node 10B illustrated in FIG. 10(D) recognizes that both states of the first group and the second group are SW-F, based on the APS packet received from the fourth boundary node 10D by using the fourth VLAN path 4D. In response that both states of the first group and the second group are recognized to be SW-F, the second boundary node 10B determines whether or not the self apparatus is the slave. Since the second boundary node 10B does not find itself as the slave, it is changed to use the fourth VLAN path 4D to relay the traffic. The second boundary node 10B transmits the APS packet in which both states, SF-W, of the first group and the second group are stored to the fourth boundary node 10D via the fourth VLAN path 4D (step S28).

Also, the fourth boundary node 10D recognizes that both states of the first group and the second group are SW-F, based on the APS packet received from the second boundary node 10B by using the fourth VLAN path 4D. In response that both states of the first group and the second group are recognized to be SW-F, the fourth boundary node 10D determines whether or not the self apparatus is the slave. Since the fourth boundary node 10D finds itself as the slave, it does not use the fourth VLAN path 4D to relay the traffic but transmits to the communication node 2B the LACP packet in which "OUT OF SYNC" is stored (step S29). Further, the fourth boundary node 10D transmits the APS packet in which both states, SF-W, of the first group and the second group are stored to the second boundary node 10B via the fourth VLAN path 4D (step S30).

Then, the communication node 2B that has received the LACP packet of "OUT OF SYNC" from the fourth boundary node 10D changes the link connection with the fourth boundary node 10D from the active state to the standby state. Further, the communication node 2B changes the link connection with the third boundary node 10C from the standby state to the active state and transmits to the third boundary node 10C the LACP packet in which "IN SYNC" is stored (step S31). As a result, the communication node 2B switches the path from the fourth boundary node 10D to the third boundary node 10C (step S32). This allows the third boundary node 10C to use the third VLAN path 4C to relay the traffic.

As a result, the second boundary node 10B and the third boundary node 10C use the third VLAN path 4C to relay the traffic between the communication node 2A and the communication node 2B (step S33).

In the first embodiment, even if a failure occurs in the active first VLAN path 4A, the first VLAN path 4A can be bypassed via the third VLAN path 4C that continuously uses the third boundary node 10C used in the first VLAN path 4A. That is, the relay system 1 uses the third VLAN path 4C to switch the path to other path routing the communication node 2A, the second boundary node 10B, the third boundary node 10C, and the communication node 2B. As a result, in the configuration in which one VLAN path 4 is provided between each pair of the opposing boundary nodes 10 in the core network 8 side, the switching of the path in response to the failure of the VLAN path 4 allows for implementing the redundancy in the VLAN path 4.

It is noted that, in the first embodiment described above, although it is assumed that the second boundary node 10B is the master and the fourth boundary node 10D is the slave, the second boundary node 10B may be the slave and the fourth boundary node 10D may be the master. In this case, even if a failure occurs in the active first VLAN path 4A, the first VLAN path 4A can be bypassed via the second VLAN path 4B that continuously uses the first boundary node 10A used in the first VLAN path 4A.

Further, in the first embodiment described above, although the VLAN paths 4 between the boundary node group 3A and the boundary node group 3B are managed in two groups of the first group and the second group, it may be managed in three groups, and an embodiment for this case will be described below as a second embodiment.

Second Embodiment

Figure 11:
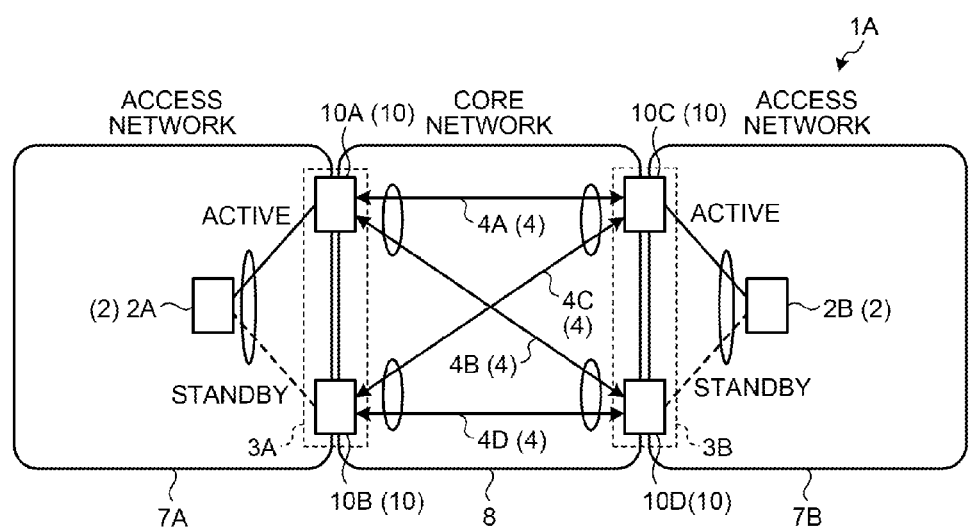
FIG. 11 is a schematic diagram illustrating an example of a network configuration of a relay system of a second embodiment.

FIG. 11 is a schematic diagram illustrating an example of the network configuration of a relay system 1A of the second embodiment, and FIG. 12 is a schematic diagram illustrating an example of the group configuration of the relay system 1A of the second embodiment. It is noted that the same components as those in the relay system 1 of the first embodiment are labeled with the same reference numerals and the duplicated description for the configuration and operation will be omitted. The relay system 1A of the second embodiment is different from the relay system 1 of the first embodiment in that four VLAN paths 4 are managed in three groups. In the second embodiment, there is a third group in addition to the first and second groups indicated in the first embodiment. In the third group, the third VLAN path 4C between the second boundary node 10B and the third boundary node 10C is managed as the active VLAN path 4, and the second VLAN path 4B between the fourth boundary node 10D and the first boundary node 10A is managed as the active VLAN path 4. Further, in the third group, the fourth VLAN path 4D between the second boundary node 10B and the fourth boundary node 10D is managed as the backup VLAN path 4.

The second boundary node 10B and the fourth boundary node 10D use the fourth VLAN path 4D to exchange the APS packet to each other. The packet exchanged between the second boundary node 10B and the fourth boundary node 10D is not used for notifying the state of the third group but used for mutually notifying the states of the first group and the second group. One of the second boundary node 10B and the fourth boundary node 10D belonging to the third group is defined as the master and the other is defined as the slave. It is noted that, for convenience sake, it is assumed that the second boundary node 10B is the master and the fourth boundary node 10D is the slave.

FIG. 13 is a schematic diagram illustrating an example of the inter-boundary node path management table 58 of the second embodiment. It is noted that, while FIG. 13 illustrates an example of the inter-boundary node path management table 58 of the second boundary node 10B, the inter-boundary node path management tables 58 in other boundary nodes 10 have the same table configuration and thus the duplicated description will be omitted. The second boundary node 10B belongs to the second group and the third group. In the core network side VLAN information 58B illustrated in FIG. 13, the entry of the first row is provided for the second group and the entry of the second row is provided for the third group. In the backup VLAN information 582 of the entry of the first row, managed are a VLAN identifier 582A and a transmission port number 582B with respect to the third VLAN path 4C as the backup VLAN path 4 of the second group.

Also, in the active VLAN information 581 of the entry of the second row, managed are a VLAN identifier 581A and a transmission port number 581B with respect to the third VLAN path 4C as the active VLAN path 4 of the third group. Further, in the backup VLAN information 582, managed are a VLAN identifier 582A and a transmission port number 582B with respect to the fourth VLAN path 4D as the backup VLAN path 4 of the third group.

That is, the second boundary node 10B refers to the inter-boundary node path management table 58 illustrated in FIG. 13 and, at the entry of the first row, the protection state 583 of the second group is recognized to be SF-W. Further, the second boundary node 10B is able to recognize the protection state of the first group to be NR, because the protection state of the second group is SF-W, based on the protection state NR/SF-W of the third group at the entry of the second row.

Figure 14:
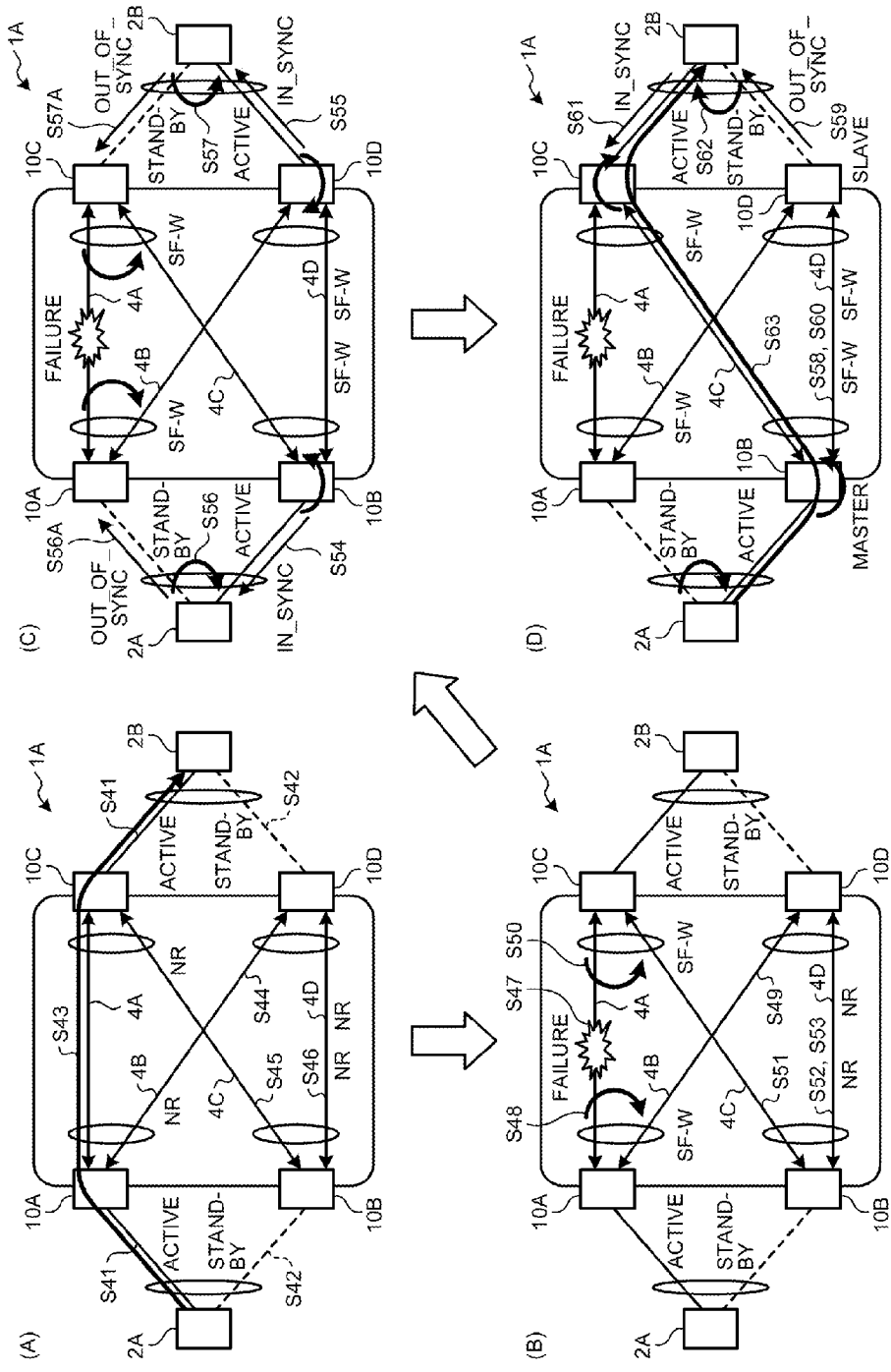
FIG. 14 is a schematic diagram illustrating a processing operation of the relay system with respect to the time of a failure in an active VLAN path in the second embodiment.

Next, the operation of the relay system 1A of the second embodiment will be described. FIG. 14 is a schematic diagram illustrating the processing operation of the relay system 1A with respect to the time of a failure in an active VLAN path 4 in the second embodiment. In the relay system 1A in the normal state illustrated in FIG. 14(A), it is assumed that there is no failure and that the active first VLAN path 4A between the first boundary node 10A and the third boundary node 10C is used.

The first boundary node 10A illustrated in FIG. 14(A) sets the link connection with the communication node 2A to the active state and the third boundary node 10C sets the link connection with the communication node 2B to the active state (step S41). As a result, the first boundary node 10A and the third boundary node 10C use the active first VLAN path 4A to relay the traffic between the communication node 2A and the communication node 2B.

Also, the second boundary node 10B sets the link connection with the communication node 2A to the standby state and the fourth boundary node 10D sets the link connection with the communication node 2B to the standby state (step S42). Therefore, the traffic between the communication node 2A and the communication node 2B is not relayed between the second boundary node 10B and the fourth boundary node 10D.

Also, the first boundary node 10A sets the first VLAN path 4A to the active state and uses the active first VLAN path 4A to allow the traffic to be relayed. Similarly, the third boundary node 10C sets the first VLAN path 4A to the active state and uses the active first VLAN path 4A to allow the traffic to be relayed. As a result, the first boundary node 10A and the third boundary node 10C use the first VLAN path 4A to relay the traffic between the communication node 2A and the communication node 2B (step S43).

At this time, the first boundary node 10A belonging to the first group stores the state of the first group, NR, in the APS packet. The first boundary node 10A then transmits the APS packet in which the state, NR, of the first group is stored to the fourth boundary node 10D via the second VLAN path 4B (step S44). Also, the third boundary node 10C belonging to the second group stores the state, NR, of the second group in the APS packet. The third boundary node 10C then transmits the APS packet in which the state, NR, of the second group is stored to the second boundary node 10B via the third VLAN path 4C (step S45).

The second boundary node 10B and the fourth boundary node 10D store both states, NR, of the first group and the second group in the APS packet. The second boundary node 10B and the fourth boundary node 10D then use the fourth VLAN path 4D to exchange the APS packet in which both states, NR, of the first group and the second group are stored (step S46). As a result, the second boundary node 10B and the fourth boundary node 10D are able to recognize both states, NR, of the first group and the second group.

In the relay system 1A illustrated in FIG. 14(B), it is assumed that a failure occurs in the active first VALN path 4A (step S47). In this case, the first boundary node 10A switches the VLAN path 4 in the active state from the active first VLAN path 4A to the backup second VLAN path 4B (step S48). As a result, the first boundary node 10A uses the second VLAN path 4B to relay the traffic. Then, the first boundary node 10A stores the state, SF-W, of the first group in the APS packet. The first boundary node 10A then transmits the APS packet in which the state, SF-W, of the first group is stored to the fourth boundary node 10D via the second VLAN path 4B (step S49).

Also, when detecting the failure of the first VLAN path 4A, the third boundary node 10C switches the VLAN path 4 in the active state from the active first VLAN path 4A to the backup third VLAN path 4C (step S50). As a result, the third boundary node 10C uses the third VLAN path 4C to relay the traffic. Then, the third boundary node 10C stores the state of the second group, SF-W, in the APS packet. The third boundary node 10C then transmits the APS packet in which the state, SF-W, of the second group is stored to the second boundary node 10B via the third VLAN path 4C (step S51).

Also, upon receiving the APS packet from the third boundary node 10C via the third VLAN path 4C, the second boundary node 10B recognizes the state, SF-W, of the second group based on the APS packet. Further, in response that the state of the second group is recognized to be SF-W, the second boundary node 10B is changed to use the third VLAN path 4C to relay the traffic. Further, the second boundary node 10B stores, in the APS packet, the new state, SF-W, of the second group and the previous state, NR, of the first group that has been received from the fourth boundary node 10D. Then, the second boundary node 10B transmits the APS packet in which the state, NR, of the first group and the state, SF-W, of the second group are stored to the fourth boundary node 10D via the fourth VLAN path 4D (step S52).

Also, upon receiving the APS packet from the first boundary node 10A via the second VLAN path 4B, the fourth boundary node 10D recognizes the state, SF-W, of the first group based on the APS packet. Further, in response that the state of the first group is recognized to be SF-W, the fourth boundary node 10D is changed to use the second VLAN path 4B to relay the traffic. The fourth boundary node 10D stores, in the APS packet, the new state, SF-W, of the first group and the previous state, NR, of the second group that has been received from the second boundary node 10B. The fourth boundary node 10D transmits the APS packet in which the state, NR, of the first group and the state, SF-W, of the second group are stored to the second boundary node 10B via the fourth VLAN path 4D (step S53).

Upon transmitting to the communication node 2A the LACP packet in which "IN SYNC" is stored, the second boundary node 10B illustrated in FIG. 14(C) sets the link connection with the communication node 2A to the active state (step S54). As a result, the second boundary node 10B transfers the traffic received from the communication node 2A to the third VLAN path 4C and transfers the traffic received from the third VLAN path 4C to the communication node 2A.

Also, upon transmitting to the communication node 2B the LACP packet in which "IN SYNC" is stored, the fourth boundary node 10D sets the link connection with the communication node 2B to the active state (step S55). As a result, the fourth boundary node 10D transfers the traffic received from the communication node 2B to the second VLAN path 4B and transfers the traffic received from the second VLAN path 4B to the communication node 2B.

Also, the communication node 2A that has received the LACP packet of "IN SYNC" from the second boundary node 10B changes the link connection with the second boundary node 10B from the standby state to the active state. Further, the communication node 2A changes the link connection with the first boundary node 10A from the active state to the standby state and transmits to the first boundary node 10A the LACP packet in which "OUT OF SYNC" is stored (step S56A). As a result, the communication node 2A switches the path from the first boundary node 10A to the second boundary node 10B (step S56).

Also, the communication node 2B that has received the LACP packet of "IN SYNC" from the fourth boundary node 10D changes the link connection with the fourth boundary node 10D from the standby state to the active state. Further, the communication node 2B changes the link connection with the third boundary node 10C from the active state to the standby state and transmits to the third boundary node 10C the LACP packet in which "OUT OF SYNC" is stored (step S57A). As a result, the communication node 2B switches the path from the third boundary node 10C to the fourth boundary node 10D (step S57).

The second boundary node 10B illustrated in FIG. 14(D) recognizes that both states of the first group and the second group are SW-F, based on the APS packet received from the fourth boundary node 10D via the fourth VLAN path 4D. In response that both states of the first group and the second group are recognized to be SW-F, the second boundary node 10B determines whether or not the self apparatus is the slave. Since the second boundary node 10B does not find itself as the slave, it is changed to use the fourth VLAN path 4D to relay the traffic. The second boundary node 10B transmits the APS packet in which both states, SF-W, of the first group and the second group are stored to the fourth boundary node 10D via the fourth VLAN path 4D (step S58).

Also, the fourth boundary node 10D recognizes that both states of the first group and the second group are SW-F, based on the APS packet received from the second boundary node 10B via the fourth VLAN path 4D. In response that both states of the first group and the second group are recognized to be SW-F, the fourth boundary node 10D determines whether or not the self apparatus is the slave. Since the fourth boundary node 10D finds itself as the slave, it does not use the fourth VLAN path 4D to relay the traffic but transmits to the communication node 2B the LACP packet in which "OUT OF SYNC" is stored (step S59). Further, the fourth boundary node 10D transmits the APS packet in which both states, SF-W, of the first group and the second group are stored to the second boundary node 10B via the fourth VLAN path 4D (step S60).

Then, the communication node 2B that has received the LACP packet of "OUT OF SYNC" from the fourth boundary node 10D changes the link connection with the fourth boundary node 10D from the active state to the standby state. Further, the communication node 2B changes the link connection with the third boundary node 10C from the standby state to the active state and transmits to the third boundary node 10C the LACP packet in which "IN SYNC" is stored (step S61). As a result, the communication node 2B switches the path from the fourth boundary node 10D to the third boundary node 10C (step S62). This results in that the third boundary node 10C uses the third VLAN path 4C to relay the traffic.

As a result, the second boundary node 10B and the third boundary node 10C use the third VLAN path 4C to relay the traffic between the communication node 2A and the communication node 2B (step S63).

In the relay system 1A of FIG. 14, when a failure occurs in the first VLAN path 4A, the third VLAN path 4C is used to switch the path to other path routing the communication node 2A, the second boundary node 10B, the third boundary node 10C, and the communication node 2B. As a result, in the configuration in which one VLAN path 4 is provided between each pair of the opposing boundary nodes 10 in the core network 8 side, the switching of the path in response to the failure of the VLAN path 4 allows for implementing the redundancy in the VLAN path 4.

Figure 15:
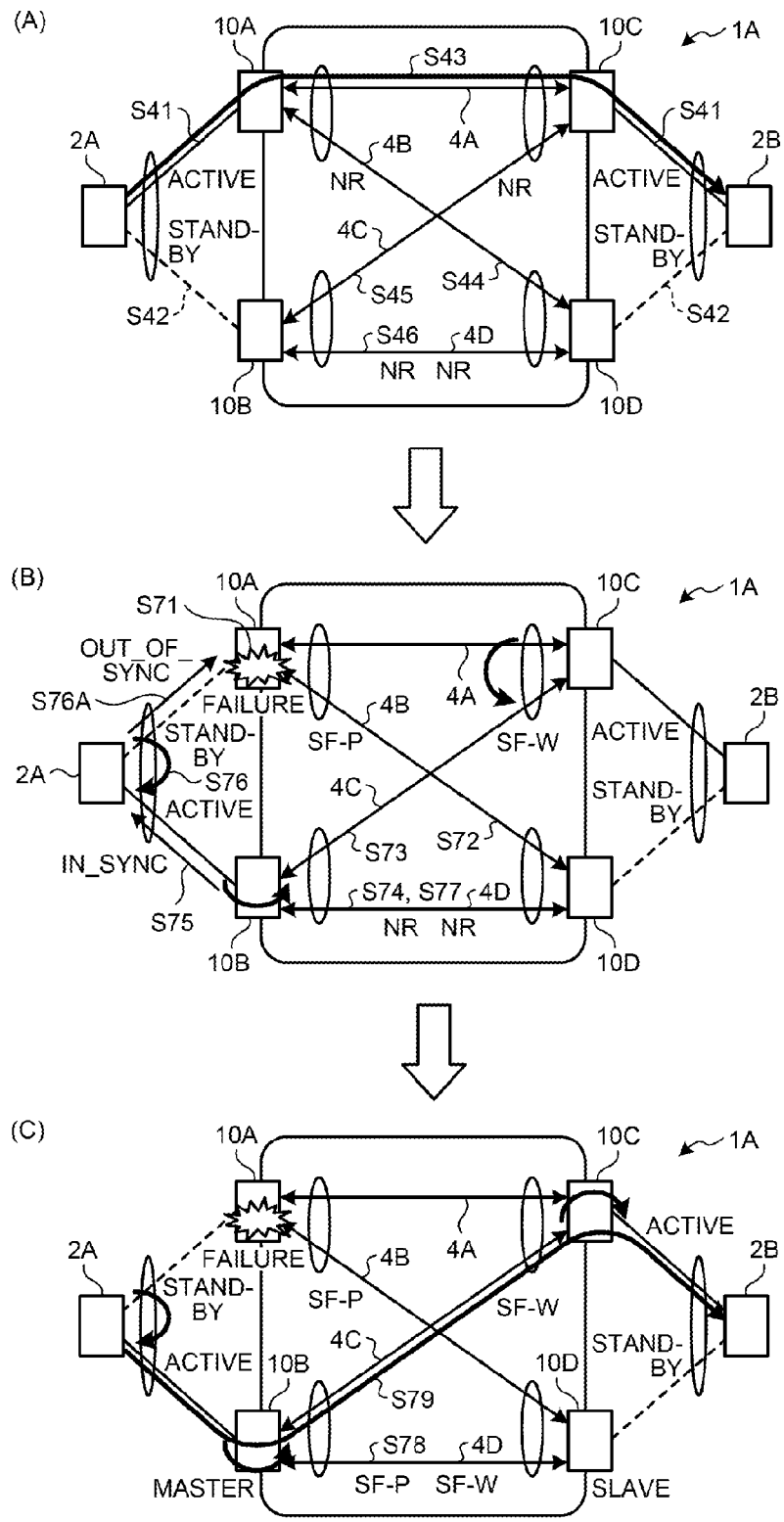
FIG. 15 is a schematic diagram illustrating a processing operation of the relay system with respect to the time of a failure in a boundary node used in an active VLAN path in the second embodiment.

Next, described will be the operation of path switching in the failure of the boundary node 10 itself used in the active VLAN path 4. FIG. 15 is a schematic diagram illustrating the processing operation of the relay system 1A with respect to the time of a failure in the boundary node used in the active VLAN path 4 in the second embodiment. In the relay system 1A in the normal state illustrated in FIG. 15(A), there is no failure and the active first VLAN path 4A is used to perform the processing operation from step S41 to step S46 similarly to FIG. 14(A). Then, the first boundary node 10A and the third boundary node 10C use the first VLAN path 4A to relay the traffic between the communication node 2A and the communication node 2B.

In the relay system 1A illustrated in FIG. 15(B), it is assumed that a failure occurs at the first boundary node 10A itself that is used in the active first VLAN path 4A (step S71).

In this case, the third boundary node 10C opposing to the first boundary node 10A recognizes that the first VLAN path 4A has the failure. Also, the fourth boundary node 10D opposing to the first boundary node 10A recognizes that the second VLAN path 4B has the failure. Upon recognizing the failure being in the backup second VLAN path 4B, the fourth boundary node 10D stores the state, SF-P, of the first group in the APS packet. The fourth boundary node 10D transmits the APS packet in which the state, SF-P, of the first group is stored to the first boundary node 10A via the second VLAN path 4B (step S72).

Also, upon recognizing the failure being in the active first VLAN path 4A, the third boundary node 10C stores the state, SF-W, of the second group in the APS packet. The third boundary node 10C transmits the APS packet in which the state, SF-W, of the second group is stored to the second boundary node 10B via the third VLAN path 4C (step S73).

Upon receiving the APS packet from the third boundary node 10C via the third VLAN path 4C, the second boundary node 10B recognizes the state, SF-W, of the second group based on the APS packet. As a result, in response that the state of the second group is recognized to be SF-W, the second boundary node 10B is changed to use the third VLAN path 4C to relay the traffic. Further, the second boundary node 10B stores, in the APS packet, the new state, SF-W, of the second group and the previous state, NR, of the first group that has been received from the fourth boundary node 10D. Then, the second boundary node 10B transmits the APS packet in which the state, NR, of the first group and the state, SF-W, of the second group are stored to the fourth boundary node 10D via the fourth VLAN path 4D (step S74).

Upon transmitting the LACP packet in which "IN SYNC" is stored to the communication node 2A, the second boundary node 10B illustrated in FIG. 10(C) sets the link connection with the communication node 2A to the active state (step S75). As a result, the second boundary node 10B transfers the traffic received from the communication node 2A to the third VLAN path 4C and transfers the traffic received from the third VLAN path 4C to the communication node 2A. Further, the communication node 2A that has received the LACP packet of "IN SYNC" from the second boundary node 10B changes the link connection with the second boundary node 10B from the standby state to the active state. Further, the communication node 2A changes the link connection with the first boundary node 10A from the active state to the standby state and transmits to the first boundary node 10A the LACP packet in which "OUT OF SYNC" is stored (step S76A). As a result, the communication node 2A switches the path from the first boundary node 10A to the second boundary node 10B (step S76).

Upon receiving the APS packet from the first boundary node 10A via the second VLAN path 4B, the fourth boundary node 10D recognizes the state, SF-P, of the first group based on the APS packet. Further, the fourth boundary node 10D stores, in the APS packet, the new state, SF-P, of the first group and the previous state, NR, of the second group that has been received from the second boundary node 10B. The fourth boundary node 10D then transmits the APS packet in which the state, SF-P, of the first group and the state, NR, of the second group are stored to the second boundary node 10B via the fourth VLAN path 4D (step S77).

The second boundary node 10B and the fourth boundary node 10D illustrated in FIG. 15(C) use the fourth VLAN path 4D to mutually exchange the APS packet and thereby recognize that the state of the first group is SF-P and the state of the second group is SF-W. As a result, in response to the recognition that the state of the first group is SF-P and the state of the second group is SF-W, the second boundary node 10B and the fourth boundary node 10D are changed to use the third VLAN path 4C to relay the traffic. Also, the second boundary node 10B and the fourth boundary node 10D store the state, SF-P, of the first group and the state, SF-W, of the second group in the APS packet. The second boundary node 10B and the fourth boundary node 10D uses the fourth VLAN path 4D to mutually exchange the APS packet in which the state, SF-P, of the first group and the state, SF-W, of the second group are stored (step S78).

The second boundary node 10B and the third boundary node 10C use the third VLAN path 4C to relay the traffic between the communication node 2A and the communication node 2B (step S79).

In the relay system 1A illustrated in FIG. 15, when the failure occurs in the first boundary node 10A itself, the third VLAN path 4C is used to switch the path to other path routing the communication node 2A, the second boundary node 10B, the third boundary node 10, and the communication node 2B. As a result, in the configuration in which one VLAN path 4 is provided between each pair of the opposing boundary nodes 10 in the core network 8 side, the switching of the path in response to the failure of the boundary node 10 itself allows for implementing the redundancy in the VLAN path 4.

Figure 16:
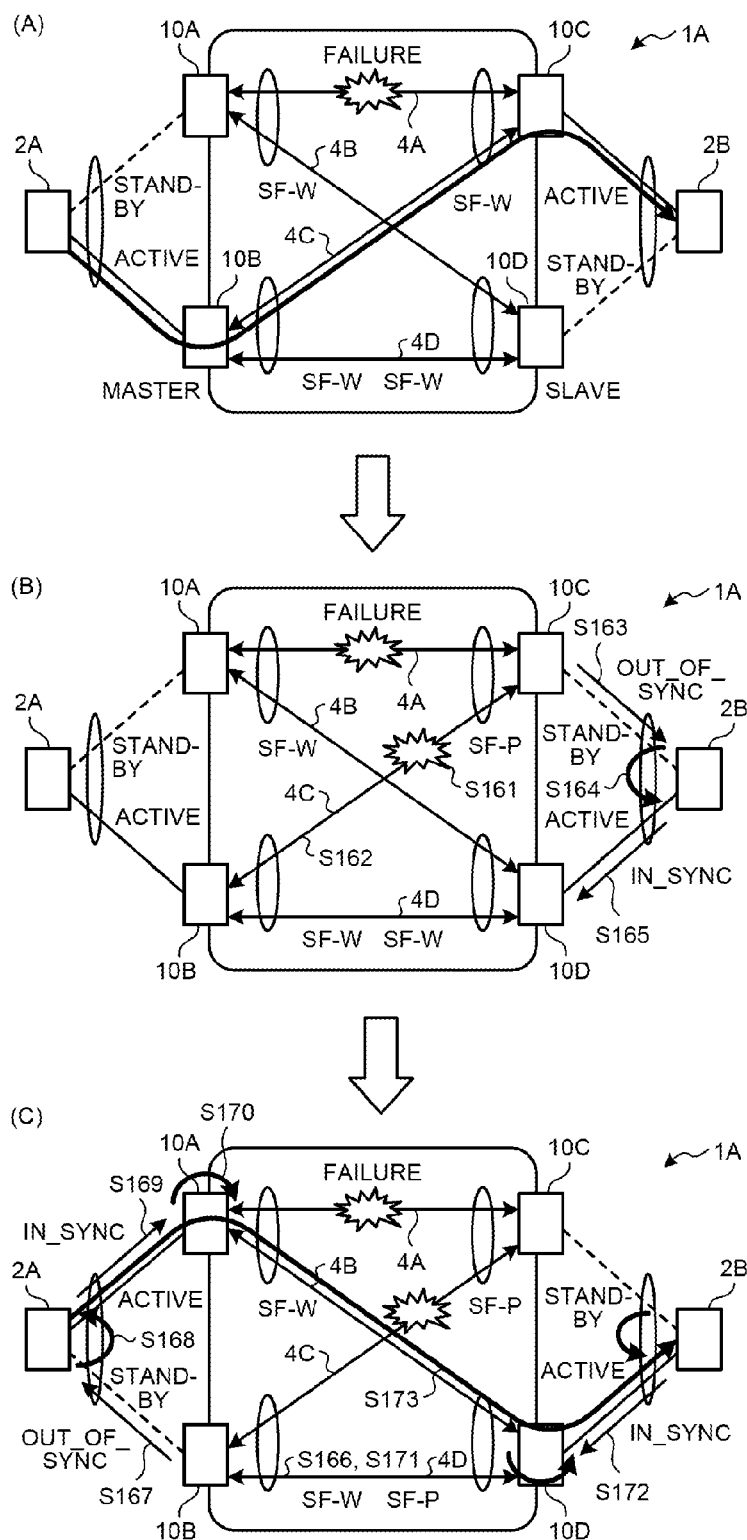
FIG. 16 is a schematic diagram illustrating a processing operation of the relay system with respect to the time of a double failure in a VLAN path in the second embodiment.

Next, a failure occurs in the third VLAN path 4C after the path switching due to the failure in the first VLAN path 4A. That is, described will be the processing operation in the case where a double failure occurs. FIG. 16 is a schematic diagram illustrating the processing operation of the relay system 1A with respect to the time of the double failure in the VLAN path 4 in the second embodiment.

In the relay system 1A illustrated in FIG. 16(A), in response to the failure in the first VLAN path 4A, it is in the state where the third VLAN path 4C has been used to relay the traffic between the communication node 2A and the communication node 2B as described with FIG. 14(D). It is noted that both states of the second boundary node 10B and the fourth boundary node 10D are SF-W. The second boundary node 10B and the fourth boundary node 10D recognize both states, SF-W, of the first group and the second group based on the APS packet received via the fourth VLAN path 4D.

Further, in the relay system 1A illustrated in FIG. 16(B), it is assumed that a failure occurs in the third VLAN path 4C (step S161). In this case, the second boundary node 10B declares SF-P as the both-system failure in the active first VLAN path 4A and the backup third VLAN path 4C of the second group, based on the state priority under the ITU-T Recommendation, G.8031 standard. Then, the second boundary node 10B stores the state, SF-P, of the second group in the APS packet. The second boundary node 10B then transmits the APS packet in which the state, SF-P, of the second group is stored to the third boundary node 10C via the third VLAN path 4C (step S162). The third boundary node 10C transmits, to the communication node 2B, the LACP packet in which "OUT OF SYNC" is stored (step S163) and thereby changes the link connection with the communication node 2B from the active state to the standby state. Further, the communication node 2B, which has received from the third boundary node 10C the LACP packet in which "OUT OF SYNC" is stored, changes the link connection with the third boundary node 10C from the active state to the standby state. Further, the communication node 2B changes the link connection with the fourth boundary node 10D from the standby state to the active state to change the path from the third boundary node 10C to the fourth boundary node 10D (step S164). Further, the communication node 2B transmits to the third boundary node 10C the LACP packet in which "IN SYNC" is stored (step S165).

Also, the second boundary node 10B illustrated in FIG. 16(C) recognizes that the traffic cannot be relayed via the third VLAN path 4C, based on the state, SF-P, of the second group in the APS packet received via the third VLAN path 4C from the third boundary node 10C. It is noted that the second boundary node 10B recognizes that the traffic cannot be relayed via the third VLAN path 4C, based on the failure detection in the third VLAN path 4C. Further, the second boundary node 10B stores, in the APS packet, the new state, SF-P, of the second group and the previous state, SF-W, of the first group that has been received from the fourth boundary node 10D. The second boundary node 10B then transmits the APS packet in which the state, SF-P, of the second group and the state, SF-W, of the first group to the fourth boundary node 10D via the fourth VLAN path 4D (step S166). Further, the second boundary node 10B transmits the LACP packet in which "OUT OF SYNC" is stored to the communication node 2A (step S167) and thereby changes the link connection with the communication node 2A from the active state to the standby state. Further, the communication node 2A, which has received from the second boundary node 10B the LACP packet in which "OUT OF SYNC" is stored, changes the link connection with the second boundary node 10B from the active state to the standby state. The communication node 2A changes the link connection with the first boundary node 10A from the standby state to the active state to switch the path from the second boundary node 10B to the first boundary node 10A (step S168). The communication node 2A then transmits to the first boundary node 10A the LACP packet in which "IN SYNC" is stored (step S169). Further, the first boundary node 10A, which has received from the communication node 2A the LACP packet in which "IN SYNC" is stored, changes the link connection with the communication node 2A from the standby state to the active state (step S170). As a result, the first boundary node 10A is changed to use the second VLAN path 4B to relay the traffic.

The fourth boundary node 10D receives from the second boundary node 10B the APS packet in which the new state, SF-P, of the second group and the previous state, SF-W, of the first group are stored. The fourth boundary node 10D recognizes that the first VLAN path 4A and the third VLAN path 4C are in the failure state, based on the state, SF-P, of the second group and the state, SF-W, of the first group. Then, in response to the recognition of the failure in the first VLAN path 4A and the third VLAN path 4C, the fourth boundary node 10D is changed to use the second VLAN path 4B to relay the traffic. Also, the fourth boundary node 10D uses the fourth VLAN path 4D to receive from the second boundary node 10B the APS packet in which the state, SF-W, of the first group and the state, SF-P, of the second group are stored (step S171). Also, the fourth boundary node 10D receives from the communication node 2B the LACP packet in which "IN SYNC" is stored (step S172), before or after the reception of the APS packet via the fourth VLAN path 4D. In response that the APS packet from the fourth VLAN path 4D and the LACP packet from the communication node 2B in which IN SYNC" is stored have arrived, the fourth boundary node 10D is changed to use the second VLAN path 4B to relay the traffic.

As a result, it is assumed that, in the relay system 1A, a failure occurs in the third VLAN path 4C between the third boundary node 10C and the second boundary node 10B after the path switching against the failure in the active first VLAN path 4A. This case results in that the first boundary node 10A and the fourth boundary node 10D use the second VLAN path 4B to relay the traffic between the communication node 2A and the communication node 2B (step S173).

In the relay system 1A of FIG. 16, even when the double failure occurs in the first VLAN path 4A and the third VLAN path 4C, the failed VLAN path 4 is bypassed via the second VLAN path 4B that continuously uses the first boundary node 10A used in the first VLAN path 4A. That is, the relay system 1A uses the second VLAN path 4B to switch the path to other path routing the communication node 2A, the first boundary node 10A, the fourth boundary node 10D, and the communication node 2B. As a result, in the configuration in which one VLAN path 4 is provided between each pair of the opposing boundary nodes 10 in the core network 8 side, even when the double failure occurs in the VLAN path 4, the switching of the path in response to the failure allows for implementing the redundancy in the VLAN path 4.

Figure 17:
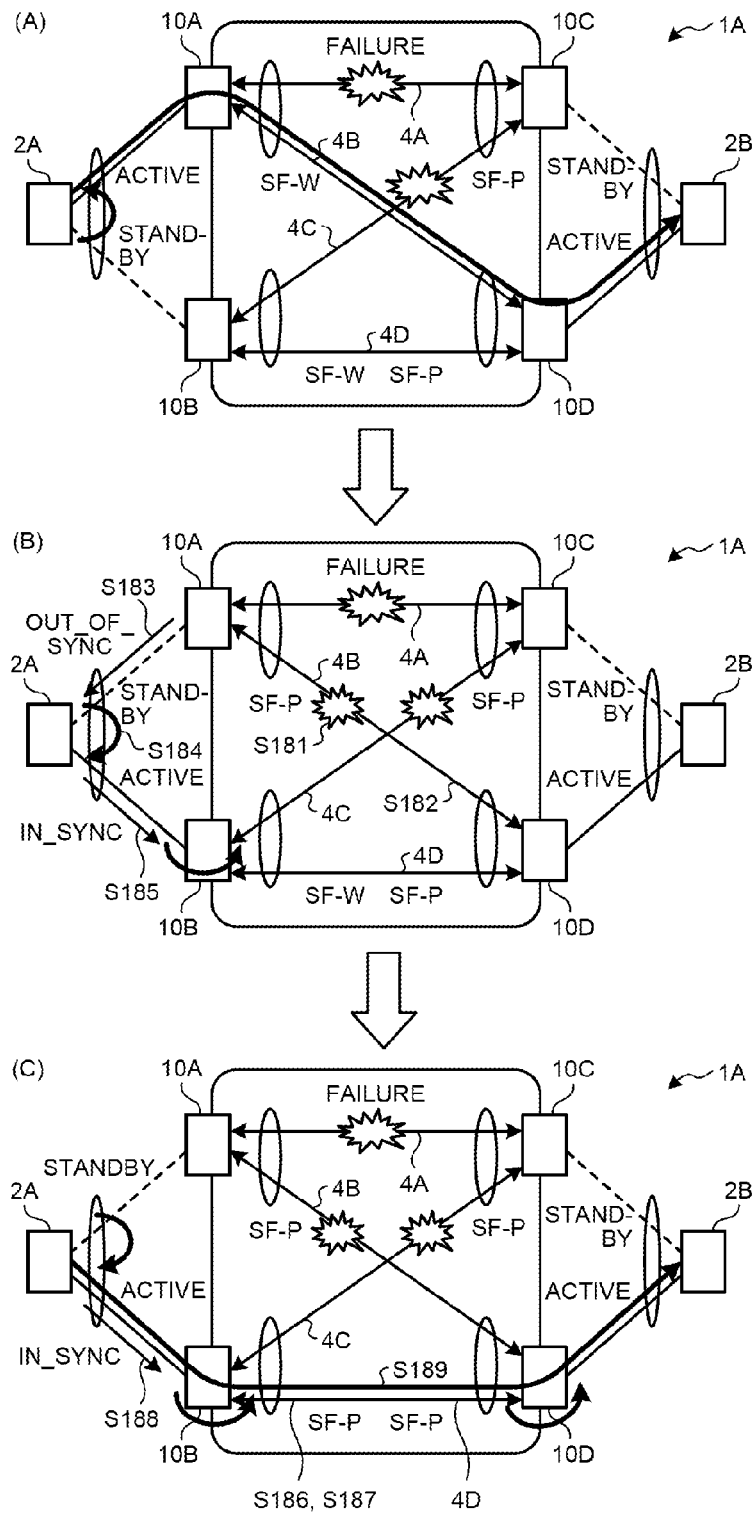
FIG. 17 is a schematic diagram illustrating a processing operation of the relay system with respect to the time of a triple failure in a VLAN path in the second embodiment.

Next, a failure occurs in the second VLAN path 4B after the path switching against the failure in the first VLAN path 4A and the third VLAN path 4C. That is, described will be the processing operation in the case that a triple failure occurs. FIG. 17 is a schematic diagram illustrating the processing operation of the relay system 1A with respect to the time of the triple failure in the VLAN path 4 in the second embodiment.

In the relay system 1A illustrated in FIG. 17(A), in response to the failures in the first VLAN path 4A and the third VLAN path 4C, it is in the state where the second VLAN path 4B has been used to relay the traffic between the communication node 2A and the communication node 2B as described in FIG. 16(C). It is noted that the state of the first group is SF-W and the state of the second group is SF-P. The second boundary node 10B and the fourth boundary node 10D recognize the state, SF-W, of the first group and the state, SF-P, of the second group based on the APS packet received via the fourth VLAN path 4D.

In the relay system 1A illustrated in FIG. 17(B), it is assumed that a failure occurs on the second VLAN path 4B (step S181). In this case, the first boundary node 10A declares SF-P as the both-system failure of the active first VLAN path 4A and the backup second VLAN path 4B of the first group. Then, the first boundary node 10A uses the second VLAN path 4B to store the state, SF-P, of the first group in the APS packet. The first boundary node 10A then transmits the APS packet in which the state, SF-P, of the first group to the fourth boundary node 10D (step S182). The first boundary node 10A transmits the LACP packet in which "OUT OF SYNC" is stored to the communication node 2A (step S183) and thereby changes the link connection with the communication node 2A from the active state to the standby state. Further, the communication node 2A, which has received from the first boundary node 10A the LACP packet in which "OUT OF SYNC" is stored, changes the link connection with the first boundary node 10A from the active state to the standby state. Further, the communication node 2A changes the link connection with the second boundary node 10B from the standby state to the active state and switches the path from the first boundary node 10A to the second boundary node 10B (step S184). Further, the communication node 2A transmits to the second boundary node 10B the LACP packet in which IN SYNC" is stored (step S185).

The fourth boundary node 10D illustrated in FIG. 17(C) recognizes that the traffic cannot be relayed via the second VLAN path 4B, based on the state, SF-P, of the first group in the APS packet received from the first boundary node 10A via the second VLAN path 4B. It is noted that the fourth boundary node 10D recognizes that the traffic cannot be relayed via the second VLAN path 4B, based on the failure detection in the second VLAN path 4B. Further, the second boundary node 10B stores, in the APS packet, the new state, SF-P, of the first group and the previous state, SF-P, of the second group that has been received from the fourth boundary node 10D. Further, the second boundary node 10B then transmits the APS packet in which the state, SF-P, of the second group and the state, SF-P, of the first group are stored to the fourth boundary node 10D via the fourth VLAN path 4D (step S186). Also, the fourth boundary node 10D stores, in the APS packet, the new state, SF-P, of the second group and the previous state, SF-P, of the first group that has been received from the second boundary node 10B. The fourth boundary node 10D then transmits the APS packet in which the state, SF-P, of the first group and the state, SF-P, of the second group are stored to the second boundary node 10B via the fourth VLAN path 4D (step S187).

Upon receiving the APS packet from the fourth boundary node 10D via the fourth VLAN path 4D, the second boundary node 10B recognizes both states of the first group and the second group are SF-P based on the APS packet. In response that both states of the first group and the second group are recognized to be SF-P, the second boundary node 10B recognizes the failures in the first VLAN path 4A, the second VLAN path 4B, and the third VLAN path 4C. Also, the second boundary node 10B receives from the communication node 2A the LACP packet in which "IN SYNC" is stored, before or after the reception of the APS packet using the fourth VLAN path 4D (step S188). Then, in response that the APS packet from the fourth VLAN path 4D and the LACP packet from the communication node 2A in which "IN SYNC" is stored have arrived, the second boundary node 10B is changed to use the fourth VLAN path 4D to relay the traffic.

As a result, it is assumed that, in the relay system 1A, a failure occurs on the second VLAN path 4B after the path switching against the failures in the first VLAN path 4A and the third VLAN path 4C. In this case, the second boundary node 10B and the fourth boundary node 10D use the fourth VLAN path 4D to relay the traffic between the communication node 2A and the communication node 2B (step S189).

In the relay system 1A of FIG. 17, even when the triple failure occurs in the first VLAN path 4A, the second VLAN path 4B, and the third VLAN path 4C, the path is changed to route the communication node 2A, the second boundary node 10B, the fourth boundary node 10D, and the communication node 2B. As a result, even if the triple failure of the VLAN path 4 occurs, the failed VLAN path 4 can be bypassed to ensure the traffic relay between the communication node 2A and the communication node 2B.

Figure 18:
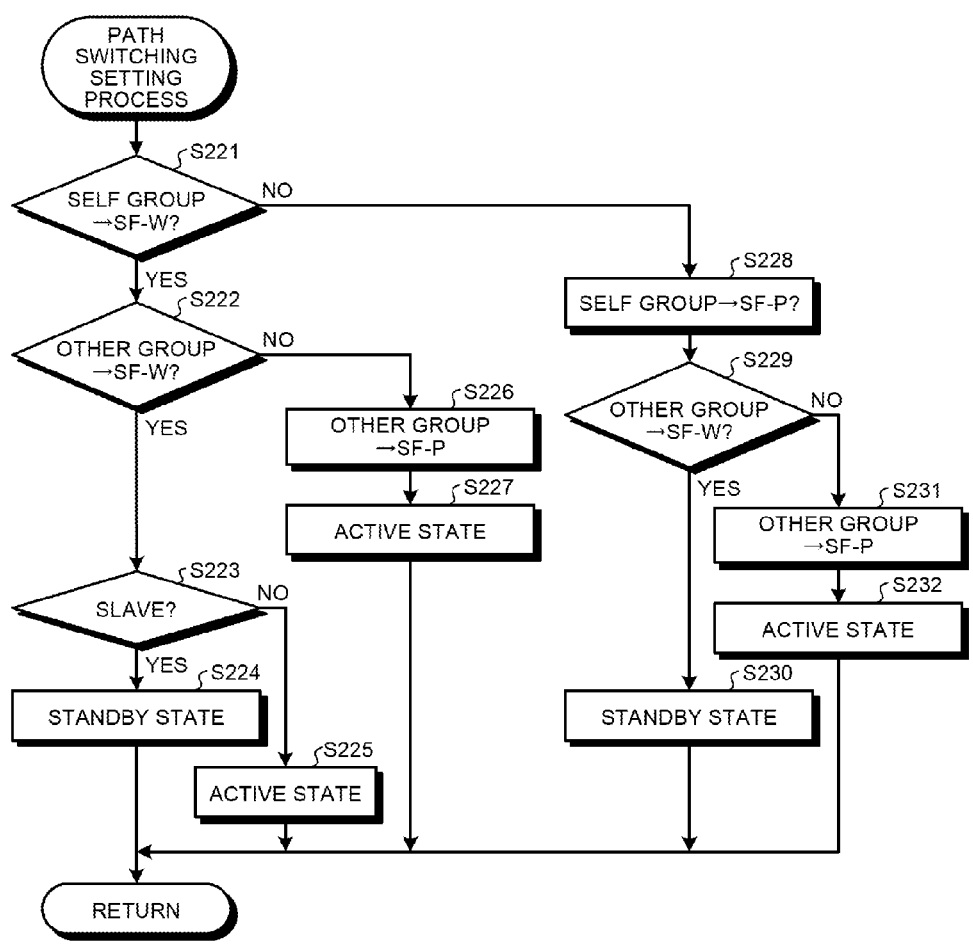
FIG. 18 is a flowchart illustrating a processing operation within the boundary node with respect to a path switch setting process.

Here, in view of the processing operation of FIG. 14 to FIG. 17, for the second boundary node 10B and the fourth boundary node 10D, for example, described will be the operation of changing the link state with the communication node 2 according to the states of the first group and the second group. FIG. 18 is a flowchart illustrating the processing operation within the boundary node with respect to a path switch setting process. The path switching process illustrated in FIG. 18 is a process to switch and set the link state with the communication node 2 of the access network 7 in the boundary node 10 side according to the states of the first group and the second group. It is noted that, in the case of the second boundary node 10B, for example, the self group corresponds to the second group while the other group corresponds to the first group.

In FIG. 18, the boundary node 10 determines whether or not the state of the self group is SF-W (step S221). If the state of the self group is SF-W (step S221, Yes), the boundary node 10 determines whether or not the state of the other group is SF-W (step S222). If the state of the other group is SF-W (step S222, Yes), the boundary node 10 recognizes that the states of the self group and the other group are SF-W. The boundary node 10 then determines whether or not the self apparatus is not one responsible for the switching, that is, whether or not it is the slave (step S223). If the self apparatus is the slave (step S223, Yes), the boundary node 10 is set to the standby state of step S59 of FIG. 14, for example (step S224), and completes the processing operation illustrated in FIG. 18. That is, the boundary node 10 transmits to the communication node 2 the LACP packet in which "OUT OF SYNC" that causes the link connection with the communication node 2 to be set to the standby state is stored.

Also, if the self apparatus is not the slave (step S223, No), the boundary node 10 determines itself to be the one responsible for the switching, sets itself to the active state of step S54 of FIG. 14, for example (step S225), and completes the processing operation illustrated in FIG. 18. That is, the boundary node 10 transmits to the communication node 2 the LACP packet in which "IN SYNC" that causes the link connection with the communication node 2 to be set to the active state is stored. If the state of the other group is not SF-W (step S222, No), for example, if the state of the other group is SF-P (step S226), the boundary node 10 recognizes that the state of the self group is SF-W and the state of the other group is SF-P. Then, in response to the recognition that the state of the self group is SF-W and the state of the other group is SF-P, the boundary node 10 is set to the active state of step S75 illustrated in FIG. 15 (step S227) and completes the processing operation illustrated in FIG. 18. That is, the boundary node 10 transmits to the communication node 2 the LACP packet in which "IN SYNC" that causes the link connection with the communication node 2 to be set to the active state is stored.

Also, if the state of the self group is not SF-W (step S221, No) and the state of the self group is SF-P (step S228), the boundary node 10 determines whether or not the state of the other group is SF-W (step S229). If the state of the other group is SF-W (step S229, Yes), the boundary node 10 recognizes that the states of the self group is SF-P and the other group is SF-W. Then, in response to the recognition that the state of the self group is SF-P and the state of the other group is SF-W, the boundary node 10 is set to the standby state of step S167 illustrated in FIG. 16 (step S230) and completes the processing operation illustrated in FIG. 18. That is, the boundary node 10 transmits to the communication node 2 the LACP packet in which "OUT OF SYNC" that causes the link connection with the communication node 2 to be set to the standby state is stored.

Also, if the state of the other group is not SF-W (step S229, No) and the state of the other group is SF-P (step S231), the boundary node 10 determines that both states of the self group and the other group are SF-P. In this case, in response to the recognition that both states of the self group and the other group are SF-P, the boundary node 10 is able to be set to the active state represented in step S188 illustrated in FIG. 17, for example (step S232), and completes the processing operation illustrated in FIG. 18. That is, the boundary node 10 receives, from the communication node 2, the LACP packet in which "IN SYNC" is stored to set the link connection with the communication node 2 to the active state. It is noted that this result in that the second boundary node 10B and the fourth boundary node 10D use the fourth VLAN path 4D.

In the process illustrated in FIG. 18, if both states of the self group and the other group are SF-W and the self apparatus is the slave, the boundary node 10 sets the link connection with the communication node 2 to the standby state, so that the link switching operation of step S59 of FIG. 14 can be implemented.

Also, if both states of the self group and the other group are SF-W, the boundary node 10 sets the link connection with the communication node 2 to the active state, so that the link switching operation of step S54 of FIG. 14 can be achieved.

Also, if the state of the self group is SF-W and the state of the other group is SF-P, the boundary node 10 sets the link connection with the communication node 2 to the active state, so that the link switching operation of step S75 of FIG. 15 can be implemented.

Also, if the state of the self group is SF-P and the state of the other group is SF-W, the boundary node 10 sets the link connection with the communication node 2 to the standby state, so that the link switching operation of step S167 of FIG. 16 can be implemented.

Also, if the state of the self group is SF-P and the state of the other group is SF-W, the boundary node 10 sets the link connection with the communication node 2 to the standby state, so that the link switching operation of step S167 of FIG. 16 can be implemented.

Also, if both states of the self group and the other group are SF-P, the boundary node 10 sets the link connection with the communication node 2 to the active state, so that the link switching operation of step S188 of FIG. 17 can be implemented.

In the relay system 1A in the second embodiment, the second boundary node 10B and the fourth boundary node 10D exchange the states of the first group and the second group by the APS packet and recognize the states of the first group and the second group. The second boundary node 10B and the fourth boundary node 10D then switch the active path based on the states of the first group and the second group. As a result, the relay system 1A is able to switch the active first VLAN path 4A as desired based on the state information of the first group and the second group.

Further, in the relay system 1A of the second embodiment, if the both states of the first group and the second group are SF-W, the second boundary node 10B and the fourth boundary node 10D recognize the failure state of the active first VLAN path 4A. If both states of the first group and the second group are SF-W, then the second boundary node 10B and the fourth boundary node 10D switch the first VLAN path 4A to the second VLAN path 4B or the third VLAN path 4C.

Further, in the relay system 1A of the second embodiment, because the fourth boundary node 10D is the slave, the failed active path is switched to the third VLAN path 4C if both states of the first group and the second group are SF-W. That is, the occurrence of the failure in the active first VLAN path 4A causes the switching to the third VLAN path 4C that continuously uses the third boundary node 10C that has been used in the first VLAN path 4A. As a result, in the configuration in which one VLAN path 4 is provided between each pair of the opposing boundary nodes 10 in the core network 8 side, the relay system 1A switches the path in response to the failure of the VLAN path 4, which allows for implementing the redundancy in the VLAN path 4.

In the relay system 1A of the second embodiment, even if a failure occurs at the first boundary node 10A itself, the failed first boundary node 10A is bypassed via the third VLAN path 4C that continuously uses the third boundary node 10C that has been used in the first VLAN path 4A. That is, the relay system 1A uses the third VLAN path 4C to switch the path to other path routing the communication node 2A, the second boundary node 10B, the third boundary node 10C, and the communication node 2B. As a result, in the configuration in which one VLAN path 4 is provided between each pair of the opposing boundary nodes 10 in the core network 8 side, the relay system 1A switches the path in response to the failure of the boundary node 10 itself, which allows for implementing the redundancy in the VLAN path 4.

In the relay system 1A of the second embodiment, even if a double failure occurs at the first VLAN path 4A and the third VLAN path 4C, the failed VLAN path 4 is bypassed via the second VLAN path 4B that continuously uses the first boundary node 10A that has been used in the first VLAN path 4A. That is, the relay system 1A uses the second VLAN path 4B to switch the path to other path routing the communication node 2A, the first boundary node 10A, the fourth boundary node 10D, and the communication node 2B. As a result, in the configuration in which one VLAN path 4 is provided between each pair of the opposing boundary nodes 10 in the core network 8 side, the relay system 1A switches the path in response to the double failure of the active and the backup VLAN paths 4, which allows for implementing the redundancy in the VLAN path 4.

In the relay system 1A of the second embodiment, if the state of the first group is SF-P and the state of the second group is SF-P in the fourth boundary node 10D, the switching to the fourth VLAN path 4D is made. That is, even if a triple failure occurs at the first VLAN path 4A, the second VLAN path 4B, and the third VLAN path 4C, the relay system 1A switches the path to other path routing the communication node 2A, the second boundary node 10B, the fourth boundary node 10D, and the communication node 2B. As a result, even if the triple failure occurs in the VLAN path 4, the relay system 1A is able to bypass the failed VLAN path 4A and ensure the path switching against the failure between the communication node 2A and the communication node 2B.

It is noted that, although the path switching for bypassing the failure of the active first VLAN path 4A has been described, for example, the path switching for bypassing the failure can be implemented also for the case when a failure occurs in the link between the boundary node 10 and the communication node 2.

Third Embodiment

Figure 19:
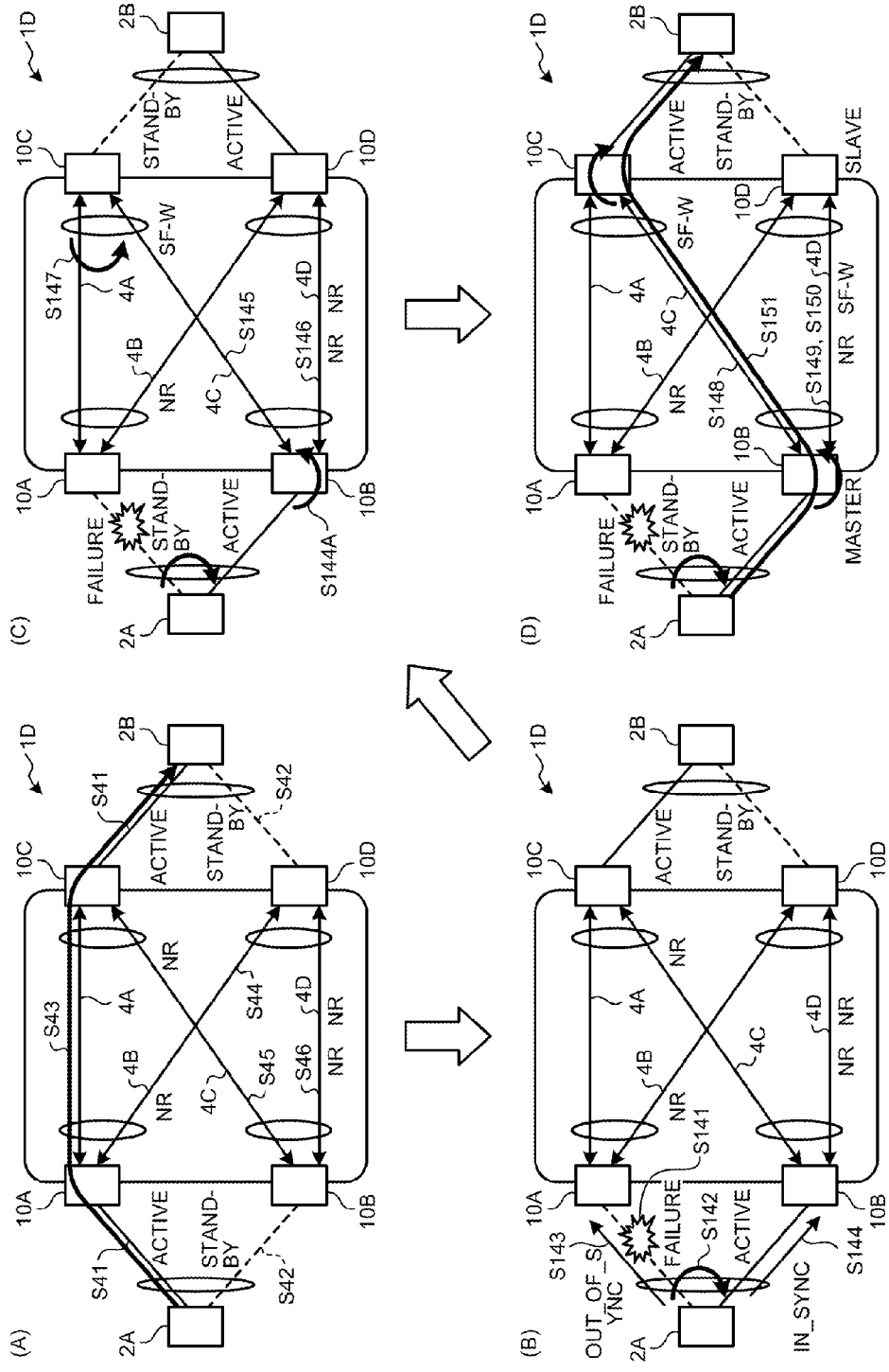
FIG. 19 is a schematic diagram illustrating a processing operation of a relay system with respect to the time of a failure in the link in a third embodiment.

Then, described as a third embodiment will be the embodiment of a relay system that is able to support the link failure between the boundary node 10 and the communication node 2. It is noted that the same components as those in the relay system 1A of the second embodiment are labeled with the same reference numerals and the duplicated description for the configuration and operation will be omitted. FIG. 19 is a schematic diagram illustrating the processing operation of a relay system 1D with respect to the time of a failure in the link in the third embodiment. In the relay system 1D in the normal state illustrated in FIG. 19(A), there is no failure and the active first VLAN path 4A is used to execute the processing operation from step S41 to step S46 similarly to FIG. 14(A). Then, the first boundary node 10A and the third boundary node 10C use the first VLAN path 4A to relay the traffic between the communication node 2A and the communication node 2B.

In the relay system 1D illustrated in FIG. 19(B), it is assumed that a failure occurs in the active state link between the communication node 2A and the first boundary node 10A (step S141). In this case, the communication node 2A changes the link connection with the first boundary node 10A from the active state to the standby state. Further, the communication node 2A changes the link connection with the second boundary node 10B from the standby state to the active state. As a result, the communication node 2A switches the active state VLAN path 4 from the first boundary node 10A to the second boundary node 10B (step S142). Further, the communication node 2A transmits to the first boundary node 10A the LACP packet in which "OUT OF SYNC" is stored (step S143) and transmits to the second boundary node 10B the LACP packet in which "IN SYNC" is stored (step S144).

The second boundary node 10B illustrated in FIG. 19(C) that has received, from the communication node 2A, the LACP packet in which "IN SYNC" is stored is changed to use the third VLAN path 4C to relay the traffic (step S144A). As a result, the second boundary node 10B recognizes the state, SF-W, of the second group. Then, the second boundary node 10B stores the state, SF-W, of the second group in the APS packet. Further, the second boundary node 10B transmits the APS packet in which the state, SF-W, of the second group is stored to the third boundary node 10C via the third VLAN path 4C (step S145).

The second boundary node 10B stores, in the APS packet, the new state, SF-W of the second group and the previous state, NR, of the first group that has been received from the fourth boundary node 10D. The second boundary node 10B transmits the APS packet in which the state, SF-W, of the second group and the state, NR, of the first group are stored to the fourth boundary node 10D via the fourth VLAN path 4D (step S146). Further, upon receiving via the third VLAN path 4C the APS packet in which the state, SF-W, of the second group is stored, the third boundary node 10C recognizes the state, SF-W, of the second group. In response to that the state, SF-W, of the second group is recognized, the third boundary node 10C switches the path from the first VLAN path 4A to the third VLAN path 4C (step S147).

The third boundary node 10C illustrated in FIG. 19(D) transmits the APS packet in which the state, SF-W, of the second group is stored to the second boundary node 10B via the third VLAN path 4C (step S148). As a result, the third boundary node 10C is able to notify the second boundary node 10B of the normal response by the transmission operation of the APS packet to the second boundary node 10B.

Also, the fourth boundary node 10D receives, from the second boundary node 10B via the fourth VLAN path 4D, the APS packet in which the new state, SF-W, of the second group and the previous state, NR, of the first group that has been received are stored (step S149). The fourth boundary node 10D transmits the APS packet in which the state, NR, of the first group and the state, SF-W, of the second group are stored to the second boundary node 10B via the fourth VLAN path 4D (step S150). As a result, the fourth boundary node 10D is able to notify the second boundary node 10B of the normal response by the transmission operation of the APS packet to the second boundary node 10B. Therefore, the second boundary node 10B and the third boundary node 10C use the third VLAN path 4C to relay the traffic between the communication node 2A and the communication node 2B (step S151).

In the relay system 1D, when the link failure between the communication node 2A and the first boundary node 10A occurs, the first VLAN path 4A affected by the failure is bypassed via the third VLAN path 4C that continuously uses the third boundary node 10C in the first VLAN path 4A. That is, the third VLAN path 4C is used to switch the path to other path routing the communication node 2A, the second boundary node 10B, the third boundary node 10C, and the communication node 2B. As a result, in the configuration in which one VLAN path 4 is provided between each pair of the opposing boundary nodes 10 in the core network 8 side, the path is switched in response to the link failure, so that redundancy in the VLAN path 4 can be implemented.

It is noted that, in the relay system 1A of the second embodiment as described above, the path is switched from the first VLAN path 4A to the backup VLAN path 4 in response to the detection of the failure in the active first VLAN path 4A.

That is, after switching the path to the backup VLAN path 4, the second boundary node 10B and the fourth boundary node 10D transmit the LACP packet instructing the communication nodes 2A and 2B to switch the link. In the MC-LAG, however, there is also a specification that the side of first boundary node 10A and the third boundary node 10C that has detected the failure of the first VLAN path 4A transmits the LACP packet for the link switching to the communication nodes 2A and 2B.

Fourth Embodiment

Then, described below as a fourth embodiment will be the embodiment supporting such system. It is noted that the same components as those in the relay system 1A of the second embodiment are labeled with the same reference numerals and the duplicated description for the configuration and operation will be omitted. The relay system 1B of the fourth embodiment is different from the relay system 1A of the second embodiment in that the link switching is instructed to the communication node 2 in response to the detection of the failure on the first VLAN path 4A.

Figure 20:
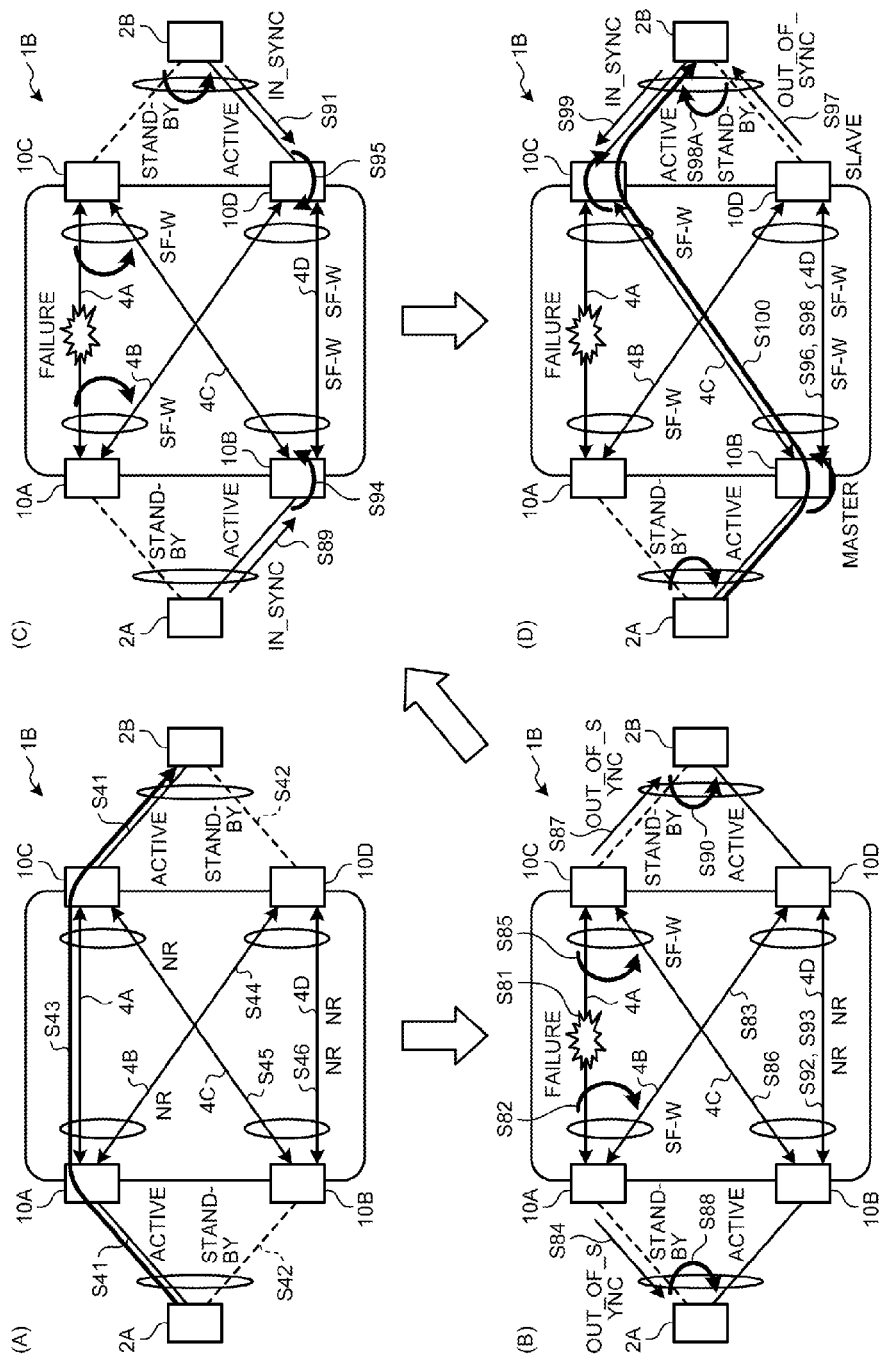
FIG. 20 is a schematic diagram illustrating a processing operation of a relay system with respect to the time of a failure in an active VLAN path in a fourth embodiment.

FIG. 20 is a schematic diagram illustrating the processing operation of the relay system 1B with respect to the time of a failure in the active VLAN path 4 in the fourth embodiment. In the relay system 1B in the normal state illustrated in FIG. 20(A), there is no failure and the active first VLAN path 4A is used to execute the processing operation from step S41 to step S46. That is, in the relay system 1B, the first VLAN path 4A is used to relay the traffic between the communication node 2A and the communication node 2B. It is noted that both states of the first group and the second group are NR. The second boundary node 10B and the fourth boundary node 10D have recognized that both states, NR, of the first group and the second group, based on the APS packet received via the fourth VLAN path 4D.

In the relay system 1B illustrated in FIG. 20(B), it is assumed that a failure occurs on the active first VLAN path 4A (step S81). In this case, the first boundary node 10A switches the active state VLAN path 4 from the active first VLAN path 4A to the backup second VLAN path 4B (step S82). As a result, the first boundary node 10A uses the second VLAN path 4B to relay the traffic. The first boundary node 10A then stores the state, SF-W, of the first group in the APS packet. Further, the first boundary node 10A transmits the APS packet in which the state, SF-W, of the first group is stored to the fourth boundary node 10D via the second VLAN path 4B (step S83). Further, the first boundary node 10A transmits the LACP packet in which "OUT OF SYNC" is stored to the communication node 2A (step S84) to set the link connection with the communication node 2A to the standby state.

Also, the third boundary node 10C switches the active state VLAN path 4 from the active first VLAN path 4A to the backup third VLAN path 4C (step S85). As a result, the third boundary node 10C uses the third VLAN path 4C to relay the traffic. The third boundary node 10C then stores the state, SF-W, of the second group in the APS packet. Further, the third boundary node 10C transmits the APS packet in which the state, SF-W, of the second group is stored to the second boundary node 10B via the third VLAN path 4C (step S86). Further, the third boundary node 10C transmits the LACP packet in which "OUT OF SYNC" is stored to the communication node 2B (step S87) to set the link connection with the communication node 2B to the standby state.

Also, the communication node 2A, which has received from the first boundary node 10A the LACP packet in which "OUT OF SYNC" is stored, changes the link connection with the first boundary node 10A from the active state to the standby state. Further, the communication node 2A changes the link connection with the second boundary node 10B from the standby state to the active state to change the path from the first boundary node 10A to the second boundary node 10B (step S88). Then, the communication node 2A illustrated in FIG. 20(C) transmits the LACP packet in which "IN SYNC" is stored to the second boundary node 10B (step S89).

Also, the communication node 2B, which has received from the third boundary node 10C illustrated in FIG. 20(B) the LACP packet in which "OUT OF SYNC" is stored, changes the link connection with the third boundary node 10C from the active state to the standby state. Further, the communication node 2B changes the link connection with the fourth boundary node 10D from the standby state to the active state to change the path from the third boundary node 10C to the fourth boundary node 10D (step S90). Then, the communication node 2B illustrated in FIG. 20(C) transmits the LACP packet in which "IN SYNC" is stored to the fourth boundary node 10D (step S91).

Also, upon receiving the APS packet from the third boundary node 10C using the third VLAN path 4C, the second boundary node 10B illustrated in FIG. 20(B) recognizes that the state of the second group is SF-W based on the APS packet. In response that the state of the second group is SF-W, the second boundary node 10B is changed to use the third VLAN path 4C to relay the traffic. Further, the second boundary node 10B stores in the APS packet the new state, SF-W, of the second group and the previous state, NR, of the first group that has been received from the fourth boundary node 10D. The second boundary node 10B transmits the APS packet in which the state, SF-W, of the second group and the state, NR, of the first group are stored to the fourth boundary node 10D via the fourth VLAN path 4D (step S92).

Also, upon receiving the APS packet from the first boundary node 10A via the second VLAN path 4B, the fourth boundary node 10D recognizes that the state of the first group is SF-W based on the APS packet. In response that the state of the first group is SF-W, the fourth boundary node 10D is changed to use the second VLAN path 4B to relay the traffic. Further, the fourth boundary node 10D stores the new state, SF-W, of the first group and the previous state, NR, of the second group that has been received from the second boundary node 10B in the APS packet. The fourth boundary node 10D transmits the APS packet in which the state, SF-W, of the first group and the state, NR, of the second group are stored to the second boundary node 10B via the fourth VLAN path 4D (step S93).

Also, upon receiving from the communication node 2A the LACP packet in which "IN SYNC" is stored, the second boundary node 10B illustrated in FIG. 20(C) sets the link connection with the communication node 2A to the active state. As a result, the second boundary node 10B uses the third VLAN path 4C to relay the traffic (step S94). That is, the second boundary node 10B transfers the traffic received from the communication node 2A to the third VLAN path 4C and transfers the traffic received from the third VLAN path 4C to the communication node 2A. It is noted that, even at the time when the second boundary node 10B relays the traffic via the third VLAN path 4C at step S94, there is a case where the second boundary node 10B is unable to receive from the communication node 2A the LACP packet in which "IN SYNC" is stored. In this case, the second boundary node 10B transmits the LACP packet in which "IN SYNC" is stored to the communication node 2A and thereby uses the third VLAN path 4C to relay the traffic after changing the link connection with the communication node 2A to the active state.

Also, upon receiving from the communication node 2A the LACP packet in which "IN SYNC" is stored, the fourth boundary node 10D sets the link connection with the communication node 2B to the active state. As a result, the fourth boundary node 10D uses the second VLAN path 4B to relay the traffic (step S95). That is, the fourth boundary node 10D transfers the traffic received from the communication node 2B to the second VLAN path 4B and transfers the traffic received from the second VLAN path 4B to the communication node 2B. It is noted that, even at the time when the fourth boundary node 10D relays the traffic using the second VLAN path 4B (step S95), there is a case where the fourth boundary node 10D is unable to receive from the communication node 2B the LACP packet in which "IN SYNC" is stored. In this case, the fourth boundary node 10D transmits the LACP packet in which "IN SYNC" is stored to the communication node 2B and thereby uses the second VLAN path 4B to relay the traffic after changing the link connection with the communication node 2B to the active state.

Also, the second boundary node 10B uses the fourth VLAN path 4D to receive from the fourth boundary node 10D the APS packet in which the new state, SF-W, of the first group and the previous state, NR, of the second group are stored. Upon receiving the APS packet, the second boundary node 10B recognizes that both states of the first group and the second group are SF-W. In response that both states of the first group and the second group are recognized to be SF-W, the second boundary node 10B determines whether or not the self apparatus is the slave. Since the second boundary node 10B does not find itself to be the slave, it is changed to use the fourth VLAN path 4D to relay the traffic. Further, the second boundary node 10B stores both states, SF-W, of the first group and the second group in the APS packet. The second boundary node 10B then transmits the APS packet in which both states, SF-W, of the first group and the second group are stored to the fourth boundary node 10D via the fourth VLAN path 4D (step S96).

Also, the fourth boundary node 10D uses the fourth VLAN path 4D to receive from the second boundary node 10B the APS packet in which the new state, SF-W, of the second group and the previous state, NR, of the first group are stored. Further, upon receiving the APS packet, the fourth boundary node 10D recognizes that both states of the first group and the second group are SF-W. In response that both states of the first group and the second group are recognized to be SF-W, the fourth boundary node 10D determines whether or not the self apparatus is the slave. Since the fourth boundary node 10D finds itself to be the slave, it transmits the LACP packet in which "OUT OF SYNC" is stored to the communication node 2B (step S97) instead of using the fourth VLAN path 4D to relay the traffic. Further, the fourth boundary node 10D stores both states, SF-W, of the first group and the second group in the APS packet. The fourth boundary node 10D then transmits the APS packet in which both states, SF-W, of the first group and the second group are stored to the second boundary node 10B via the fourth VLAN path 4D (step S98).

Then, the communication node 2B, which has received from the fourth boundary node 10D the LACP packet in which "OUT OF SYNC" is stored, changes the link connection with the fourth boundary node 10D from the active state to the standby state. Further, the communication node 2B changes the link connection with the third boundary node 10C from the standby state to the active state and switches the path from the fourth boundary node 10D to the third boundary node 10C (step S98A). The communication node 2B then transmits the LACP packet in which "IN SYNC" is stored to the third boundary node 10C (step S99). The third boundary node 10C then uses the third VLAN path 4C to relay the traffic.

As a result, the second boundary node 10B and the third boundary node 10C use the third VLAN path 4C to relay the traffic between the communication node 2A and the communication node 2B (step S100).

In the fourth embodiment, even if a failure occurs on the active first VLAN path 4A, the failed first VLAN path 4A is bypassed via the third VLAN path 4C that continuously uses the third boundary node 10C that has been used with the first VLAN path 4A. That is, the relay system 1B uses the third VLAN path 4C to switch the path to other path routing the communication node 2A, the second boundary node 10B, the third boundary node 10C, and the communication node 2B. As a result, in the configuration in which one VLAN path 4 is provided between each pair of the opposing boundary nodes 10 in the core network 8 side, the switching of the path in response to the link failure allows for implementing the redundancy in the VLAN path 4.

In the fourth embodiment, upon detecting the failure of the first VLAN path 4A, the first boundary node 10A and the third boundary node 10C output, to the communication node 2 which is connected to the self apparatus, the "OUT OF SYNC" LACP packet adapted to set the link connection to the standby state. As a result, the relay system 1B of the fourth embodiment is able to support the MC-LAG whose specification instructs the link switching for the communication node to be linked at the side of the boundary node 10 which is connected to the failed VLAN path 4.

Fifth Embodiment

Next, the relay system of the fifth embodiment will be described. It is noted that the same components as those in the relay system 1A of the second embodiment are labeled with the same reference numerals and the duplicated description for the configuration and operation will be omitted. The relay system 1C of the fifth embodiment is different from the relay system 1A of the second embodiment in the reduced number of consecutive operations for the link switching between the fourth boundary node 10D as the slave side and the communication node 2B, for example.

Figure 21:
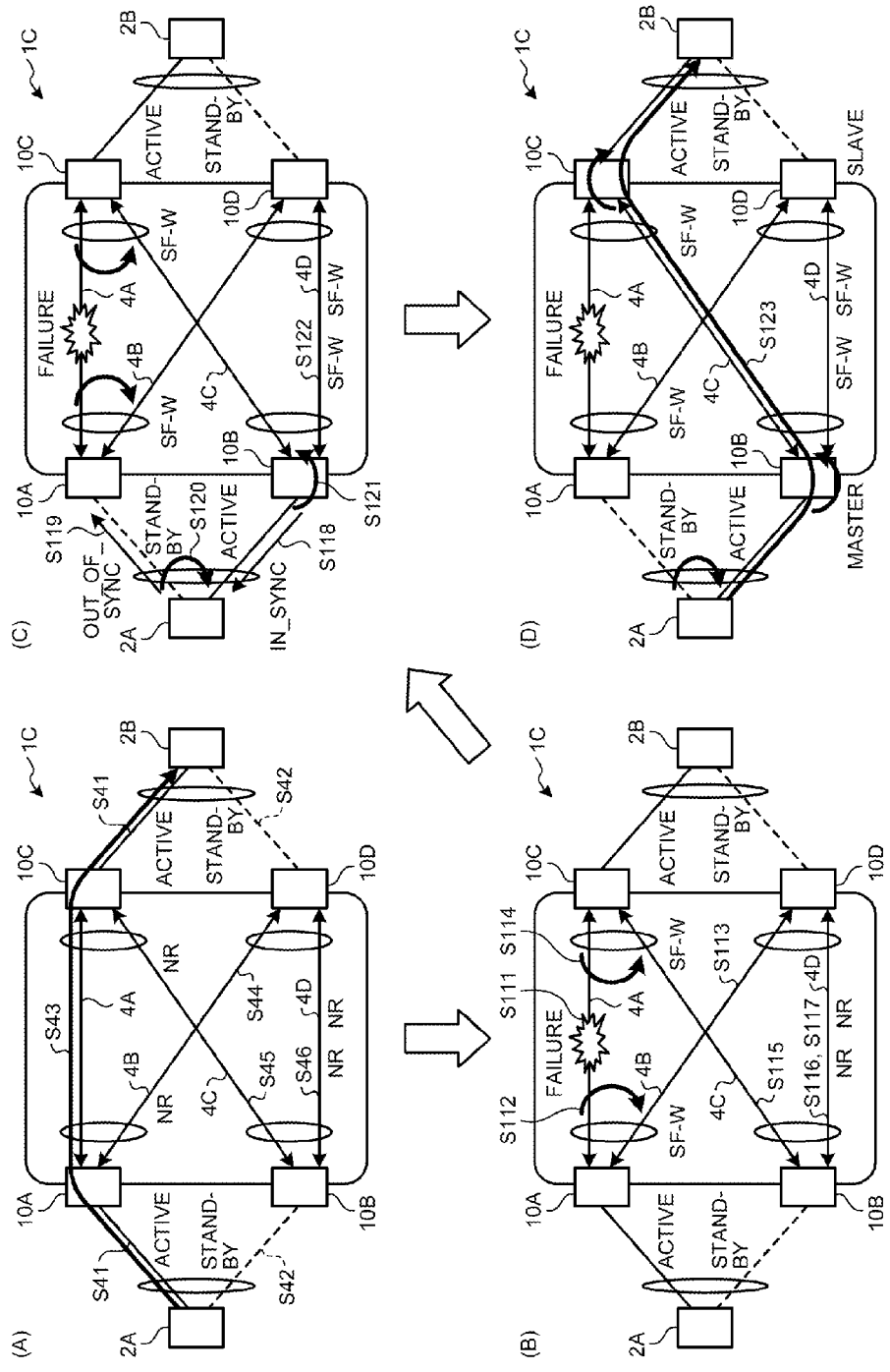
FIG. 21 is a schematic diagram illustrating a processing operation of a relay system with respect to the time of a failure in an active VLAN path in a fifth embodiment.

FIG. 21 is a schematic diagram illustrating the processing operation of the relay system 1C with respect to the time of a failure in an active VLAN path 4 in the fifth embodiment. In the relay system 1C in the normal state illustrated in FIG. 21(A), there is no failure and the active first VLAN path 4A is used to execute the processing operation from step S41 to step S46. That is, in the relay system 1C, the first VLAN path 4A is used to relay the traffic between the communication node 2A and the communication node 2B.

In the relay system 1C illustrated in FIG. 21(B), it is assumed that a failure occurs on the active first VLAN path 4A (step S111). In this case, the first boundary node 10A switches the active state VLAN path 4 from the active first VLAN path 4A to the backup second VLAN path 4B (step S112). As a result, the first boundary node 10A uses the second VLAN path 4B to relay the traffic. The first boundary node 10A then stores the state, SF-W, of the first group in the APS packet. Further, the first boundary node 10A transmits the APS packet in which the state, SF-W, of the first group is stored to the fourth boundary node 10D via the second VLAN path 4B (step S113).

Also, upon detecting the failure on the active first VLAN path 4A, the third boundary node 10C switches the active state VLAN path 4 from the active first VLAN path 4A to the backup third VLAN path 4C (step S114). As a result, the third boundary node 10C uses the third VLAN path 4C to relay the traffic. The third boundary node 10C then stores the state, SF-W, of the second group in the APS packet. Further, the third boundary node 10C transmits the APS packet in which the state, SF-W, of the second group is stored to the second boundary node 10B via the third VLAN path 4C (step S115).

Also, upon receiving the APS packet from the third boundary node 10C via the third VLAN path 4C, the second boundary node 10B recognizes that the state of the second group is SF-W based on the APS packet. In response that the state of the second group is recognized to be SF-W, the second boundary node 10B is changed to use the third VLAN path 4C to relay the traffic. The second boundary node 10B stores, in the APS packet, the new state, SF-W, of the second group and the previous state, NR, of the first group that has been received from the fourth boundary node 10D. Further, the second boundary node 10B transmits the APS packet in which the state, SF-W, of the second group and the state, NR, of the first group are stored to the second boundary node 10B via the third VLAN path 4C (step S116).

Also, upon receiving the APS packet from the first boundary node 10A via the second VLAN path 4B, the fourth boundary node 10D recognizes that the state of the first group is SF-W based on the APS packet. In response that the state of the first group is recognized to be SF-W, the fourth boundary node 10D is changed to use the second VLAN path 4B to relay the traffic. The fourth boundary node 10D stores, in the APS packet, the new state, SF-W, of the first group and the previous state, NR, of the second group that has been received from the second boundary node 10B. Further, the fourth boundary node 10D transmits the APS packet in which the state, SF-W, of the first group and the state, NR, of the second group are stored to the second boundary node 10B via the fourth VLAN path 4D (step S117).

The second boundary node 10B illustrated in FIG. 21(C) transmits the LACP packet in which "IN SYNC" is stored to the communication node 2A (step S118) and thereby sets the link connection with the communication node 2A to the active state. As a result, the second boundary node 10B uses the third VLAN path 4C to relay the traffic. That is, the second boundary node 10B transfers the traffic received from the communication node 2A to the third VLAN path 4C and transfers the traffic received from the third VLAN path 4C to the communication node 2A.

Also, the fourth boundary node 10D determines whether or not the self apparatus is the slave. If the self apparatus is the slave, the fourth boundary node 10D starts the timing operation after predetermined time has elapsed. It is noted that the fourth boundary node 10D automatically transmits the LACP packet in which "IN SYNC" is stored to the communication node 2B after the predetermined time has elapsed and thereby sets the link connection with the communication node 2B to the active state. As a result, the fourth boundary node 10D uses the second VLAN path 4B to relay the traffic. That is, the fourth boundary node 10D transfers the traffic received from the communication node 2B to the second VLAN path 4B and the transfers the traffic received from the second VLAN path 4B to the communication node 2B.

Also, the communication node 2A, which has received from the second boundary node 10B the LACP packet in which "IN SYNC" is stored, changes the link connection with the second boundary node 10B from the standby state to the active state. Further, the communication node 2A changes the link connection with the first boundary node 10A from the active state to the standby state to switch the path from the first boundary node 10A to the second boundary node 10B (step S120).

Further, the communication node 2A relays the traffic to the second boundary node 10B that has received the LACP packet in which "IN SYNC" is stored (step S121). The second boundary node 10B uses the fourth VLAN path 4D to receive, from the fourth boundary node 10D, the APS packet in which the new state, SF-W, of the first group and the previous state, NR, of the second group are stored. Also, upon receiving the APS packet from the fourth boundary node 10D, the second boundary node 10B recognizes that both states of the first group and the second group are SF-W based on the APS packet. Further, in response that both states of the first group and the second group are SF-W, the second boundary node 10B determines whether or not the self apparatus is the slave. Since the second boundary node 10B does not find itself to be the slave, it is changed to use the fourth VLAN path 4D to relay the traffic. Further, the second boundary node 10B stores both states, SF-W, of the first group and the second group in the APS packet. The second boundary node 10B then transmits the APS packet in which both states, SF-W, of the first group and the second group are stored to the fourth boundary node 10D via the fourth VLAN path 4D (step S122).

Also, the fourth boundary node 10D uses the fourth VLAN path 4D to receive, from the second boundary node 10B, the APS packet in which the new state, SF-W, of the second group and the previous state, NR, of the first group are stored. Upon receiving the APS packet from the second boundary node 10B, the fourth boundary node 10D recognizes that both states of the first group and the second group are SF-W based on the APS packet. In response that both states of the first group and the second group are recognized to be SF-W, the fourth boundary node 10D determines whether or not the predetermined time has elapsed.

Also, because the fourth boundary node 10D has transmitted the LACP packet in which "IN SYNC" is stored to the communication node 2B when the predetermined time has already elapsed, its link to the communication node 2B is in the active state. Therefore, when the predetermined time has already elapsed, the fourth boundary node 10D does not relay the traffic via the fourth VLAN path 4D but transmits the LACP packet in which "OUT OF SYNC" is stored to the communication node 2B.

Also, before the predetermined time has elapsed, it is the state where the fourth boundary node 10D has not yet been transmitted the LACP packet in which IN SYNC" is stored to the communication node 2B. Therefore, the communication node 2B is in the state where its link to the fourth boundary node 10D is the standby state and the link to the third boundary node 10C is the active state. As a result, the fourth boundary node 10D that is the slave side does not require the link switching operation to the communication node 2B such as steps S59, S61, and S62 of FIG. 14, for example.

Therefore, the second boundary node 10B and the third boundary node 10C use the third VLAN path 4C to relay the traffic between the communication node 2A and the communication node 2B (step S123).

In the fifth embodiment, even if a failure occurs in the active first VLAN path 4A, the failed first VLAN path 4A is bypassed via the third VLAN path 4C that continuously uses the third boundary node 10C used with the first VLAN path 4A. That is, the relay system 1C uses the third VLAN path 4C to switch the path to other path routing the communication node 2A, the second boundary node 10B, the third boundary node 10C, and the communication node 2B. As a result, in the configuration in which one VLAN path 4 is provided between each pair of the opposing boundary nodes 10 in the core network 8 side, the switching of the path in response to the failure on the VLAN path 4 allows for implementing the redundancy in the VLAN path 4.

In the fifth embodiment, for example, if both states of the first group and the second group are recognized to be SF-W and if the self apparatus is the master, the second boundary node 10B outputs the LACP packet of "IN SYNC" to the communication node 2. Further, if the fourth boundary node 10D is the slave and the state, SF-W, of the first group is received using the second VLAN path 4B, the timing operation for counting the predetermined time is started. The fourth boundary node 10D then starts the timing operation for counting the predetermined time and, at the timing after the predetermined time has elapsed, outputs the LACP packet in which "IN SYNC" is stored to the communication node 2B connected to the self apparatus. Further, if both states of the first group and the second group are recognized to be SF-W before the predetermined time has elapsed, the fourth boundary node 10D stops the timing operation for counting the predetermined time. That is, the fourth boundary node 10D inhibits the output of the LACP packet in which "IN SYNC" is stored to the communication node 2B until the predetermined time has elapsed. As a result, in the fourth boundary node 10D that is the slave side, the number of the link switching operations with the communication node 2B is reduced compared to the system of FIG. 14, so that the processing load of the fourth boundary node 10D and the communication node 2B side can be reduced.

Also, in the above-described second embodiment, upon the detection of the failure on the active first VLAN path 4A, the third VLAN path 4C is used to automatically switch the path to other path routing the communication node 2A, the second boundary node 10B, the third boundary node 10C, and the communication node 2B. In the relay system 1A of the MC-LAG system, however, a case where the path is switched manually that conforms with the ITU-T Recommendation, G.8031, may be considered.

Sixth Embodiment

Figure 22:
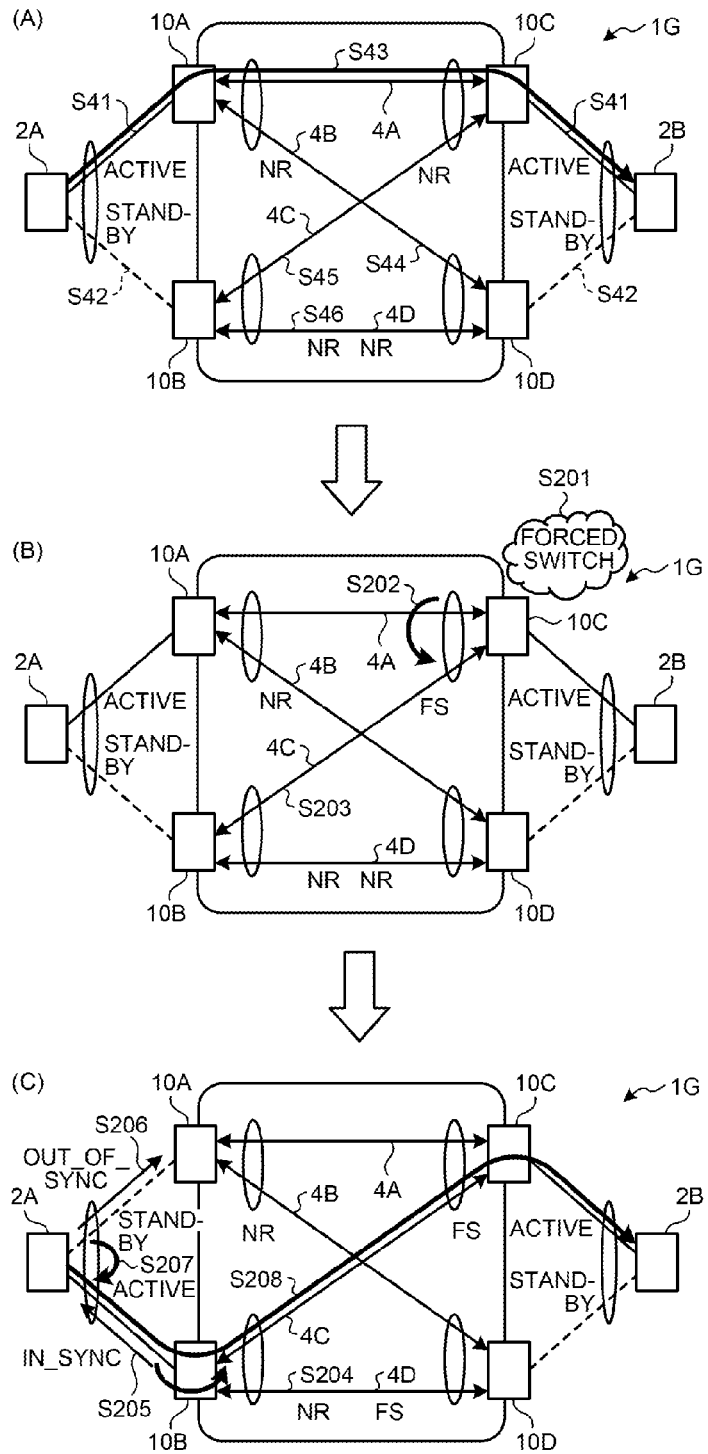
FIG. 22 is a schematic diagram illustrating a processing operation of a relay system with respect to the time of a manual switching of the VLAN path in a sixth embodiment.

Then, described below as a sixth embodiment will be the embodiment of the relay system in which the path may be switched manually. FIG. 22 is a schematic diagram illustrating the processing operation of a relay system 1G with respect to the time of a manual switching of the VLAN path 4 in the sixth embodiment. It is noted that the same components as those in the relay system 1A of the second embodiment are labeled with the same reference numerals and the duplicated description for the configuration and operation will be omitted. The relay system 1G of the sixth embodiment is different from the relay system 1A of the second embodiment in that the path switching scale of the VLAN path 4 is restricted according to the manual switching to the boundary node 10.

In the relay system 1G in the normal state illustrated in FIG. 22(A), there is no failure and the active first VLAN path 4A is used to execute the processing operation from step S41 to step S46 similarly to FIG. 14(A). That is, in the relay system 1G, the first VLAN path 4A is used to relay the traffic between the communication node 2A and the communication node 2B. It is noted that both states of the first group and the second group are NR. The second boundary node 10B and the fourth boundary node 10D have recognized that both states, NR, of the first group and the second group, based on the APS packet received via the fourth VLAN path 4D.

In the relay system 1G illustrated in FIG. 22(B), it is assumed that a manual switching command is applied to the third boundary node 10C used on the active first VLAN path 4A (step S201). In this case, the third boundary node 10C switches the active state VLAN path 4 from the active first VLAN path 4A of the second group to the backup second VLAN path 4B (step S202). As a result, the third boundary node 10C uses the third VLAN path 4C to relay the traffic. In response to the application of the manual switching command, the third boundary node 10C stores the state, FS, of the second group in the APS packet. The third boundary node 10C transmits the APS packet in which the state, FS, of the second group is stored to the second boundary node 10B via the third VLAN path 4C (step S203). When the second boundary node 10B uses the third VLAN path 4C and receives, from the third boundary node 10C, the APS packet in which the state, FS, of the second group is stored, it is changed to use the third VLAN path 4C to relay the traffic.

The second boundary node 10B illustrated in FIG. 22(C) stores, in the APS packet, the new state, FS, of the second group and the previous state, NR, of the first group that has been received from the fourth boundary node 10D. The second boundary node 10B then transmits the APS packet in which the state, NR, of the first group and the state, FS, of the second group are stored to the fourth boundary node 10D via the fourth VLAN path 4D (step S204). The second boundary node 10B transmits the LACP packet in which "IN SYNC" is stored to the communication node 2A (step S205) and thereby sets the link connection with the communication node 2A to the active state. As a result, the second boundary node 10B transfers the traffic received from the communication node 2A to the third VLAN path 4C and transfers the traffic received from the third VLAN path 4C to the communication node 2A. Further, the communication node 2A, which has received from the second boundary node 10B the LACP packet in which "IN SYNC" is stored, changes the link connection with the second boundary node 10B from the standby state to the active state. Further, the communication node 2A changes the link connection with the first boundary node 10A from the active state to the standby state and transmits the LACP packet in which "OUT OF SYNC" is stored to the first boundary node 10A (step S206). As a result, the communication node 2A switches the path from the first boundary node 10A to the second boundary node 10B (step S207).

The second boundary node 10B and the third boundary node 10C then use the third VLAN path 4C to relay the traffic between the communication node 2A and the communication node 2B (step S208).

In the relay system 1G of FIG. 22, in response that the manual switching command is applied to the third boundary node 10C using the active first VLAN path 4A, the path is changed to other path routing the communication node 2A, the second boundary node 10B, the third boundary node 10C, and the communication node 2B. As a result, the relay system 1G switches the path by continuously using the third boundary node 10C used in the active first VLAN path 4A. Then, in the configuration in which one VLAN path 4 is provided between each pair of the opposing boundary nodes 10 in the core network 8 side, the relay system 1G makes the path switching by the manual switching, which allows for implementing the redundancy in the VLAN path 4.

Figure 23:
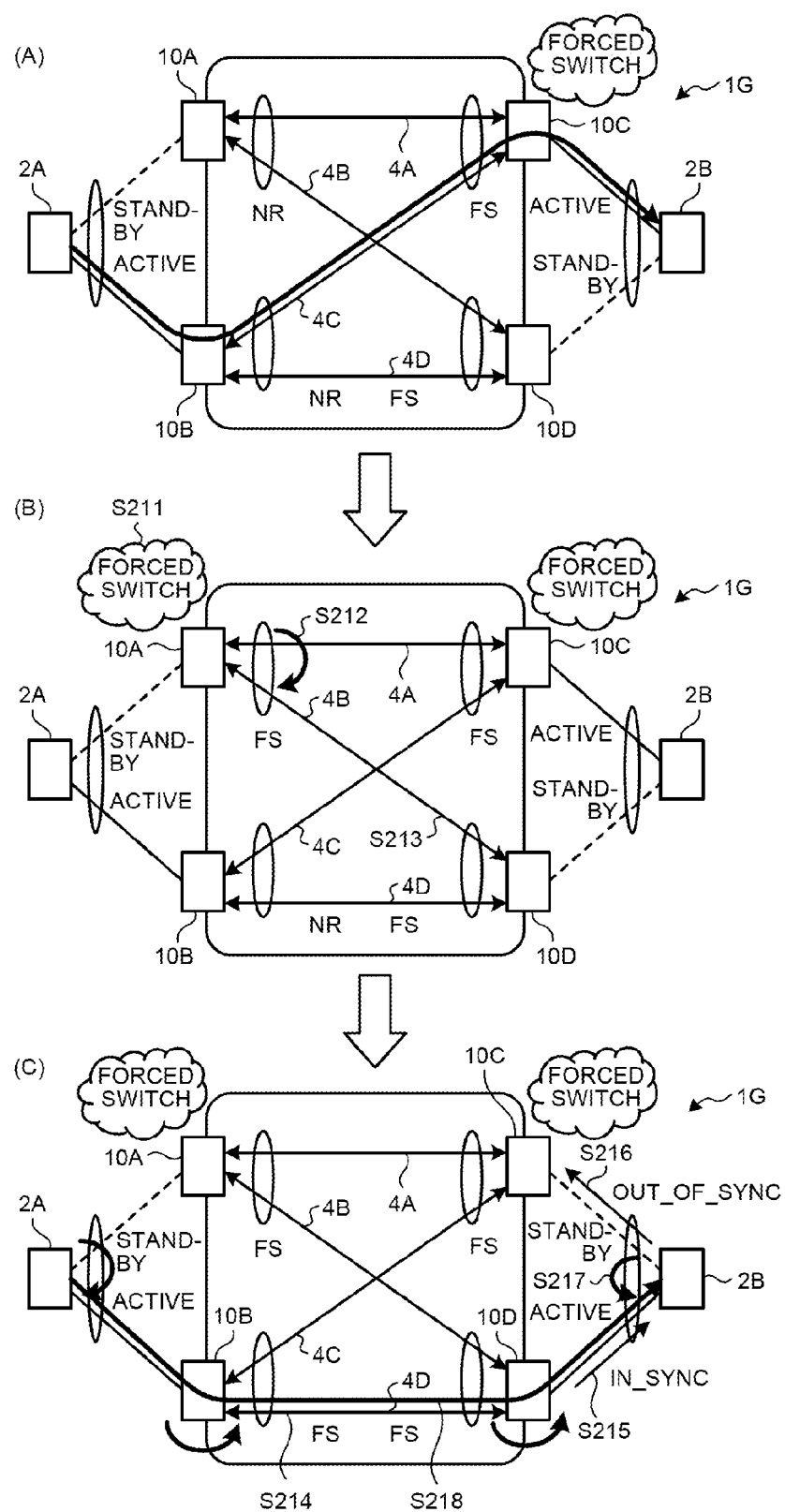
FIG. 23 is a schematic diagram illustrating a processing operation of a relay system with respect to the time of a manual switching of the VLAN path in the sixth embodiment.

Next, described will be the operation of the case where another manual switching command is further applied to the first boundary node 10A after the path switching by the manual switching command to the third boundary node 10C. FIG. 23 is a schematic diagram illustrating the processing operation of the relay system 1G with respect to the time of a manual switching of the VLAN path 4 in the sixth embodiment.

In the relay system 1G illustrated in FIG. 23(A), in response that a manual switching command to the third boundary node 10C is applied, the third VLAN path 4C is used to relay the traffic between the communication node 2A and the communication node 2B as described with FIG. 22(C). It is noted that the state of the first group is NR and the state of the second group is FS. The second boundary node 10B and the fourth boundary node 10D recognize the state, NR, of the first group and the state, FS, of the second group based on the APS packet received using the fourth VLAN path 4D.

In the relay system 1G illustrated in FIG. 23(B), it is assumed that the manual switching command is applied to the first boundary node 10A (step S211). In this case, the first boundary node 10A switches the active state VLAN path 4 from the active first VLAN path 4A of the first group to the backup second VLAN path 4B (step S212). As a result, the first boundary node 10A uses the second VLAN path 4B to relay the traffic. In response that the manual switching command is applied, the first boundary node 10A stores the state, FS, of the first group in the APS packet. Further, the first boundary node 10A transmits the APS packet in which the state, FS, of the first group is stored to the fourth boundary node 10D via the second VLAN path 4B (step S213). When the APS packet in which the state, FS, of the first group is stored is received from the first boundary node 10A by using the second VLAN path 4B, the fourth boundary node 10D is changed to use the second VLAN path 4B to relay the traffic.

The second boundary node 10B illustrated in FIG. 23(C) stores in the APS packet the new state, FS, of the first group and the previous state, FS, of the second group that has been received from the fourth boundary node 10D. The second boundary node 10B then transmits the APS packet in which the states, FS, of the first group and the second group are stored to the fourth boundary node 10D via the fourth VLAN path 4D (step S214). The fourth boundary node 10D transmits the LACP packet in which "IN SYNC" is stored to the communication node 2A (step S215) and thereby sets the link connection with the communication node 2B to the active state. As a result, the fourth boundary node 10D transfers the traffic received from the communication node 2B to the fourth VLAN path 4D and transfers the traffic received from the fourth VLAN path 4D to the communication node 2B. Further, the communication node 2B that has received the LACP packet storing "IN SYNC" from the fourth boundary node 10D changes the link connection with the fourth boundary node 10D from the standby state to the active state. Further, the communication node 2B changes the link connection with the third boundary node 10C from the active state to the standby state and transmits the LACP packet in which "OUT OF SYNC" is stored to the second boundary node 10B (step S216). As a result, the communication node 2B switches the path from the third boundary node 10C to the fourth boundary node 10D (step S217).

It is noted that, when the second boundary node 10B uses the fourth VLAN path 4D and receives the APS packet in which both states, FS, of the first group and the second group are stored, the second boundary node 10B recognizes both states of the first group and the second group are FS. In response that both states of the first group and the second group are recognized to be FS, the second boundary node 10B is changed to use the fourth VLAN path 4D to relay the traffic. Also, the fourth boundary node 10D uses the fourth VLAN path 4D to transmit the APS packet in which both states, FS, of the first group and the second group are stored to the second boundary node 10B. As a result, the relay system 1G uses the fourth VLAN path 4D to relay the traffic between the communication node 2A and the communication node 2B (step S218).

In the relay system 1G of the sixth embodiment, if the state of the second group obtained with the third VLAN path 4C is FS, for example, the second boundary node 10B recognizes that the state of the second group is the switching state by the manual switching command. The second boundary node 10B then switches the path to the third VLAN path 4C. As a result, in the configuration in which one VLAN path 4 is provided between each pair of the opposing boundary nodes 10 in the core network 8 side, the relay system 1G switches the path by the manual switching command, so that the redundancy in the VLAN path 4 can be implemented.

In the relay system 1G of the sixth embodiment, it is assumed that a manual switching command is applied to the first boundary node 10A after the path switching by the manual switching to the third boundary node 10C. In this case, the path is also switched to other path routing the communication node 2A, the second boundary node 10B, the fourth boundary node 10D, and the communication node 2B. As a result, the relay system 1G is able to ensure the traffic relay between the communication node 2A and the communication node 2B even in the case of the path switching by the twice manual switching commands.

Seventh Embodiment

Figure 24:
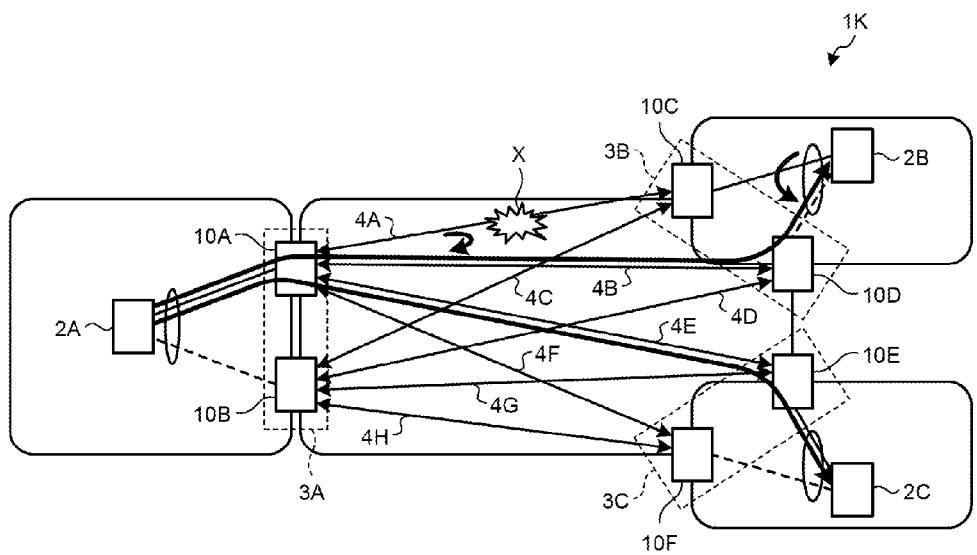
FIG. 24 is a schematic diagram illustrating a processing operation of a relay system with respect to the time of a failure in an active VLAN path in a seventh embodiment.
Figure 25:
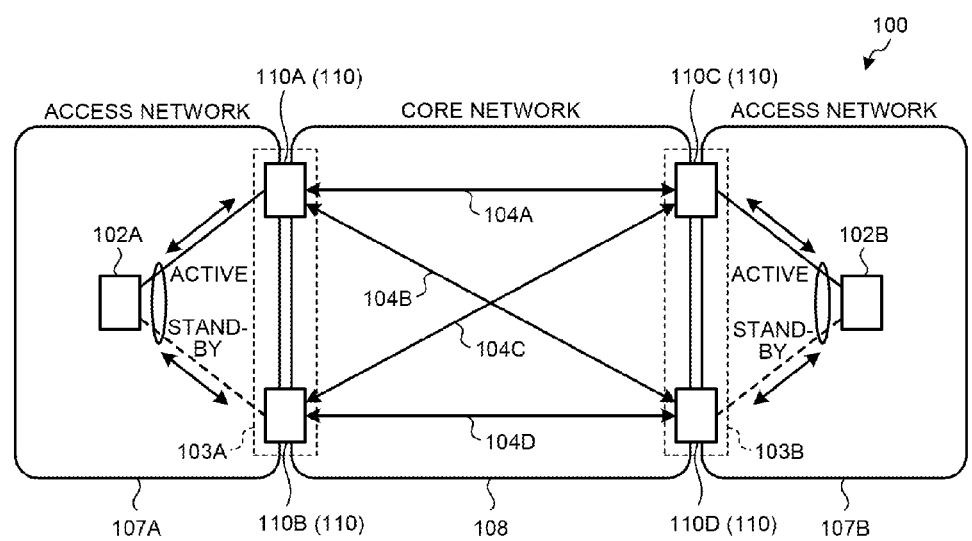
FIG. 25 is a schematic diagram illustrating the configuration of the network built with the MC-LAG.

It is noted that, in the above-described first to sixth embodiments, the descriptions have been provided for the example of the case where the number of the communication node 2 (2B) opposing to the communication node 2A is one. However, the number of the communication nodes 2 opposing to the communication node 2A is not limited to one, and the embodiment of such case will be described below as an seventh embodiment. FIG. 24 is a schematic diagram illustrating an example of the network configuration of a relay system 1K of the seventh embodiment. It is noted that the same components as those in the relay system 1A of the second embodiment are labeled with the same reference numerals and the duplicated description for the configuration and operation will be omitted.

The relay system 1K of the seventh embodiment is different from the relay system 1A of the second embodiment in that a plurality of the communication nodes (2B, 2C) opposing to the communication node 2A are provided.

The communication node 2A is connected to the boundary node group 3A including the first boundary node 10A and the second boundary node 10B. Further, the communication node 2B is connected to the opposing boundary node group 3B including the third boundary node 10C and the fourth boundary node 10D. Further, the communication node 2C is connected to an opposing boundary node group 3C including a fifth boundary node 10E and a sixth boundary node 10F.

Also, the boundary node group 3A and the opposing boundary node group 3B are connected by four VLAN paths 4 of the first VLAN path 4A to the fourth VLAN path 4D, as described above. In the relay system 1K, the four VLAN paths are managed in three groups of a first group to a third group. The first boundary node 10A, the second boundary node 10B, the third boundary node 10C, and the fourth boundary node 10D are able to mutually exchange the APS packet on the VLAN path 4 as described above to recognize the states of the first group and the second group.

Also, the boundary node group 3A and the opposing boundary node group 3B are connected by in total four VLAN paths 4 of a fifth VLAN path 4E to an eighth VLAN path 4H. It is noted that the fifth VLAN path 4E is a path providing a link connection between the first boundary node 10A and the fifth boundary node 10E. A sixth VLAN path 4F is a path providing a link connection between the first boundary node 10A and the sixth boundary node 10F. A seventh VLAN path 4G is a path providing a link connection between the second boundary node 10B and the fifth boundary node 10E. The eighth VLAN path 4H is a path providing a link connection between the second boundary node 10B and the sixth boundary node 10F.

Also, in the relay system 1K, the four VLAN paths 4 between the boundary node group 3A and the opposing boundary node group 3C are managed in three groups of a fourth group to a sixth group. In the fourth group, the fifth VLAN path 4E between the first boundary node 10A and the fifth boundary node 10E is managed as the active VLAN path 4. Further, in the fourth group, the sixth VLAN path 4F between the first boundary node 10A and the sixth boundary node 10F is managed as the backup VLAN path 4. Also, in the fifth group, the seventh VLAN path 4G between the second boundary node 10B and the fifth boundary node 10E is managed as the active VLAN path 4. Also, in the sixth group, the sixth VLAN path 4F between the first boundary node 10A and the sixth boundary node 10F is managed as the active VLAN path 4. Further, in the sixth group, the eighth VLAN path 4H between the second boundary node 10B and the sixth boundary node 10F is managed as the backup VLAN path 4.

Also, the first boundary node 10A, the second boundary node 10B, the fifth boundary node 10E, and the sixth boundary node 10F are able to mutually exchange the APS packet on the VLAN path 4 as described above to recognize the states of the fourth group and the fifth group.

In the relay system 1K illustrated in FIG. 24, the first boundary node 10A and the third boundary node 10C use the active first VLAN path 4A to relay the traffic between the communication node 2A and the communication node 2B. At the same time, in the relay system 1K, the first boundary node 10A and the fifth boundary node 10E use the active fifth VLAN path 4E to relay the traffic between the communication node 2A and the communication node 2C. That is, in the communication node 2A, the shared use of the first boundary node 10A allows for the multiplexed communication between the communication node 2B and the communication node 2C. Therefore, the first boundary node 10A distributes the traffic from the communication node 2A into the traffic for the communication node 2B and the traffic for the communication node 2C. Then, the first boundary node 10A transfers the traffic for the communication node 2B to the first VLAN path 4A and transfers the traffic for the communication node 2C to the fifth VLAN path 4E.

Here, it is assumed that a failure X occurs on the active first VLAN path 4A between the communication node 2A and the communication node 2B. It is noted that, for convenience sake, it is assumed that the second boundary node 10B is the slave, and the fourth boundary node 10D is the master. In this case, as illustrated in FIG. 10(A) to FIG. 10(C) as described above, the second boundary node 10B and the fourth boundary node 10D recognize that both states of the first group and the second group are SF-W.

In response that both states, SF-W, of the first group and the second group are recognized, the second boundary node 10B determines whether or not the self apparatus is the slave. The second boundary node 10B finds itself to be the slave and thus transmits the LACP packet in which "OUT OF SYNC" is stored to the communication node 2A. Upon receiving the LACP packet of "OUT OF SYNC", the communication node 2A switches the path from the second boundary node 10B to the first boundary node 10A. The communication node 2A then transmits the LACP packet in which "IN SYNC" is stored to the first boundary node 10A. As a result, the first boundary node 10A uses the second VLAN path 4B to relay the traffic.

That is, the first boundary node 10A and the fourth boundary node 10D use the second VLAN path 4B to relay the traffic between the communication node 2A and the communication node 2B. Therefore, even if a failure occurs between the communication node 2A and the communication node 2B, the first boundary node 10A used in the first VLAN path 4A can still be used. That is, in the configuration in which one VLAN path 4 is provided between each pair of the opposing boundary nodes 10 in the core network 8 side, the path switching in response to the occurrence of the failure allows for implementing the redundancy of the VLAN path 4.

As a result, the failed first VLAN path 4A is bypassed and the traffic with the communication node 2B can be relayed without affecting the traffic relay with the communication node 2C using the fifth VLAN path 4E that shares the use of the first boundary node 10A.

In the seventh embodiment, it is assumed that a failure occurs on the first VLAN path 4A under the situation where the communication node 2A to the first boundary node 10A are shared and used to relay the traffic with respective communication nodes 2B and 2C via the first VLAN path 4A and the fifth VLAN path 4E. Also in this case, the relay system 1K of the seventh embodiment is able to continue to use the first boundary node 10A, which has been used in the failed first VLAN path 4A, and switch it to the second VLAN path 4B so as to bypass the failed first VLAN path 4A. As a result, the traffic relay with the communication node 2B can be implemented without affecting the traffic with the communication node 2C using the fifth VLAN path 4E.

As set forth, in each embodiment as described above, in the configuration in which one VLAN path 4 is provided between each pair of the opposing boundary nodes 10 in the core network 8 side, for example, the path switching in response to the occurrence of the failure allows for implementing the redundancy of the VLAN path 4. Also, in each embodiment as described above, the redundancy of the path can be implemented based on the Ethernet™. Therefore, it is unnecessary to implement the IP (Internet Protocol) in the boundary node 10. In other words, the boundary node 10 is not required to be a router or a Layer-3 switch, but may be a Layer-2 switch. Therefore, there are advantages that the network can be built with low cost and that its management will be easier.

It is noted that, although the communication node 2 has been described as the switch apparatus 20, it may be a host apparatus and the like that is able to communicate with other communication apparatus. Further, although it has been described that the communication node 2 is connected by not-depicted network to the opposite side of the boundary node 10 link-connected by the LAG, it may be a terminal.

Further, although the second to sixth embodiments as described above manage the VLAN paths 4 between the boundary node group 3A and the boundary node group 3B in three groups, these embodiments may manage them in two groups as exemplified in the first embodiment.

Further, in the relay system 1K of the seventh embodiment as described above, the number of the communication nodes 2 opposing to the communication node 2A is two, the number of the opposing communication nodes 2 may be more than two.

Further, each component of each part as illustrated is not necessarily required to be configured as depicted in a physical term. That is, the specific manner of distribution and/or integration of each part is not limited to what is depicted, but a whole of or a part of it may be mechanically or physically distributed and/or integrated by any unit according to the various types of load, usage, and so on.

Furthermore, for each processing function performed at each apparatus, a whole of or any part of it may be executed on a CPU (Central Processing Unit) (MPU (Micro Processing Unit)), an MCU (Micro Controller Unit) and the like. Further, for each processing function, a whole of or any part of it may of course be performed on a program interpreted and executed by the CPU or hardware with the wired logic.

The disclosed system allows for implementing the redundancy to the paths in the configuration in which one path is provided between each pair of the opposing boundary nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising:
   a first communication apparatus and a second communication apparatus, and a third communication apparatus and a fourth communication apparatus provided opposing to the first communication apparatus and the second communication apparatus with connected by logic line paths, wherein
   the first communication apparatus comprises:
   a notification unit adapted to use a second path connected to the fourth communication apparatus and to notify the fourth communication apparatus of state information indicating a state of a first path connected to the third communication apparatus,
   the third communication apparatus comprises:
   a notification unit adapted to use a third path connected to the fourth communication apparatus and to notify the second communication apparatus of state information indicating a state of the first path,
   the second communication apparatus and the fourth communication apparatus comprise:
   an exchanging unit adapted to use a fourth path connected between the second communication apparatus and the fourth communication apparatus and to exchange the state information notified from the first communication apparatus with the state information notified from the third communication apparatus; and
   a switching unit adapted to, when the state information notified from the first communication apparatus and the state information notified from the third communication apparatus are information indicating a failure state of the first path that is an active path and when the self apparatus is one responsible for a switching, switch the active path to a backup path that is the second path or the third path connected to the self apparatus.

2. The communication system according to claim 1, wherein the second communication apparatus and the fourth communication apparatus further comprises:
   an output unit adapted to, when the state information notified via the backup path connected to the self apparatus is information indicating a failure state of the active path and when the self apparatus is not the one responsible for the switching, start a timing operation for counting predetermined time, output to a link destination connected to the self apparatus a message for setting a link with the link destination to a used state at a timing when the predetermined time has elapsed, and, when the state information notified from the first communication apparatus and the state information notified from the third communication apparatus are information indicating a failure state of the active path, stop the timing operation for counting the predetermined time before the predetermined time has elapsed.

3. The communication system according to claim 1, wherein
the switching unit of the second communication apparatus further adapted to, when the state information notified from the third communication apparatus is information indicating a failure state of the active path and the state information notified from the first communication apparatus is information indicating a failure state of the backup path, perform a switching to the third path that is the backup path connected to the self apparatus, and
the switching unit of the fourth communication apparatus further adapted to, when the state information notified from the first communication apparatus is information indicating a failure state of the active path and the state information notified from the third communication apparatus is information indicating a failure state of the backup path, perform a switching to the second path that is the backup path connected to the self apparatus.

4. The communication system according to claim 1, wherein the switching units of the second communication apparatus and the fourth communication apparatus are further adapted to, when the state information notified from the first communication apparatus and the state information notified from the third communication apparatus are information indicating a failure state of the backup path, perform a switching to the fourth path.

5. The communication system according to claim 1, wherein the switching units of the second communication apparatus and the fourth communication apparatus are further adapted to, when the state information obtained on the backup path connected to the self apparatus is information indicating a forced switching state by a command, perform a switching to the backup path connected to the self apparatus.

6. The communication system according to claim 1, wherein the switching units of the second communication apparatus and the fourth communication apparatus are further adapted to, when the state information notified from the first communication apparatus and the state information notified from the third communication apparatus are information indicating a forced switching state by a command, perform a switching to the fourth path.

7. The communication system according to claim 1, wherein the first communication apparatus and the third communication apparatus further comprise an output unit adapted to, in response to a detection of a failure on the active path, output to a link destination connected to the self apparatus a message for setting a link with the link destination to a standby state.

8. The communication system according to claim 1, wherein the second communication apparatus and the fourth communication apparatus further comprise an output unit adapted to, when the state information notified from the first communication apparatus and the state information notified from the third communication apparatus are information indicating a failure state of the active path and the self apparatus is the one responsible for the switching, output to a link destination connected to the self apparatus a message for setting a link with the link destination to a used state.

9. The communication system according to claim 1, wherein the second communication apparatus and the fourth communication apparatus further comprise a output unit adapted to, when the state information notified from the first communication apparatus and the state information notified from the third communication apparatus are information indicating a failure state of the active path and the self apparatus is not the one responsible for the switching, output to a link destination connected to the self apparatus a message for setting a link with the link destination to a standby state.

10. The communication system according to claim 1, wherein the exchanging units of the second communication apparatus and the fourth communication apparatus are further adapted to, when a message for setting a link with a link destination to a used state is received from the link destination connected to the self apparatus, use the backup path connected to the self apparatus and notify the third communication apparatus or the first communication apparatus connected to the backup path of state information indicating the failure of the active path.

11. The communication system according to claim 1, wherein
the exchanging unit of the second communication apparatus adapted to use the fourth path and to notify the fourth communication apparatus of the state information indicating the state of the third path, and
the exchanging unit of the fourth communication apparatus adapted to use the fourth path and to notify the third communication apparatus of the state information indicating the state of the second path.

12. A communication method in a communication system having a first communication apparatus and a second communication apparatus, and a third communication apparatus and a fourth communication apparatus provided opposing to the first communication apparatus and the second communication apparatus with connected by logic line paths, the communication method comprising:
at the first communication apparatus, using a second path connected to the fourth communication apparatus and notifying the fourth communication apparatus of state information indicating a state of a first path connected to the third communication apparatus,
at the third communication apparatus, using a third path connected to the fourth communication apparatus and notifying the second communication apparatus of state information indicating a state of the first path,
at the second communication apparatus and the fourth communication apparatus, using a fourth path connected between the second communication apparatus and the fourth communication apparatus and exchanging the state information notified from the first communication apparatus with the state information notified from the third communication apparatus; and
when the state information notified from the first communication apparatus and the state information notified from the third communication apparatus are information indicating a failure state of the first path that is an active path and the self apparatus is one responsible for a switching, switching the active path to a backup path that is the second path or the third path connected to the self apparatus.

13. A communication apparatus that is a second communication apparatus or a fourth communication apparatus in a communication system having a first communication apparatus and the second communication apparatus, and a third communication apparatus and the fourth communication apparatus provided opposing to the first communication apparatus and the second communication apparatus with connected by logic line paths, the communication apparatus comprising:

an exchanging unit adapted to use a fourth path connected between the second communication apparatus and the fourth communication apparatus and to exchange state information notified from the first communication apparatus that indicates a state of a first path connected between the first communication apparatus and the third communication apparatus that is obtained using a second path connected between the first communication apparatus and the fourth communication apparatus with state information notified from the third communication apparatus that indicates a state of the first path that is obtained using a third path connected between the third communication apparatus and the second communication apparatus; and a switching unit adapted to, when the state information notified from the first communication apparatus and the state information notified from the third communication apparatus are information indicating a failure state of an active path that is the first path and the self apparatus is one responsible for a switching, switch the active path to a backup path that is the second path or the third path connected to the self apparatus.

* * * * *